United States Patent
Hollander et al.

(10) Patent No.: US 8,995,646 B2
(45) Date of Patent: Mar. 31, 2015

(54) SYSTEM AND METHOD FOR IDENTIFYING A CALLER VIA A CALL CONNECTION, AND MATCHING THE CALLER TO A USER SESSION INVOLVING THE CALLER

(71) Applicant: Jacada Inc., Atlanta, GA (US)

(72) Inventors: Gideon Hollander, Hod Ha'Sharon (IL); Christian George du Toit, Atlanta, GA (US); Steven James Herlocher, Norcross, GA (US)

(73) Assignee: Jacada Inc., Atlanta, GA (US)

( * ) Notice: Subject to any disclaimer, the term of this patent is extended or adjusted under 35 U.S.C. 154(b) by 0 days.

(21) Appl. No.: 13/916,751

(22) Filed: Jun. 13, 2013

(65) Prior Publication Data

US 2014/0369485 A1 Dec. 18, 2014

(51) Int. Cl.
*H04M 3/51* (2006.01)
*H04M 3/42* (2006.01)

(52) U.S. Cl.
CPC ........ *H04M 3/42008* (2013.01); *H04M 3/5191* (2013.01)
USPC ............. 379/265.09; 379/265.05; 379/265.11

(58) Field of Classification Search
CPC ........................ H04M 3/42008; H04M 3/5191
USPC ........................... 379/265.01–265.03, 265.05, 379/265.09–265.14
See application file for complete search history.

(56) References Cited

U.S. PATENT DOCUMENTS

| | | | |
|---|---|---|---|
| 5,884,032 A * | 3/1999 | Bateman et al. ............. 709/204 |
| 6,301,480 B1 * | 10/2001 | Kennedy et al. ............. 455/445 |
| 7,254,641 B2 * | 8/2007 | Broughton et al. ........... 709/240 |
| 7,424,442 B2 * | 9/2008 | Wong et al. ................. 705/14.68 |
| 8,054,952 B1 | 11/2011 | Or-Bach et al. |
| 2005/0002514 A1 * | 1/2005 | Shafiee et al. ........... 379/265.09 |
| 2006/0093124 A1 * | 5/2006 | Inamdar ................... 379/265.02 |
| 2007/0265873 A1 | 11/2007 | Sheth et al. |
| 2009/0154671 A1 | 6/2009 | Weiss et al. |
| 2009/0248420 A1 | 10/2009 | Basir et al. |
| 2010/0190477 A1 | 7/2010 | Williams et al. |
| 2010/0241664 A1 | 9/2010 | LeVasseur et al. |
| 2011/0019812 A1 | 1/2011 | Sankaranarayanan |

(Continued)

OTHER PUBLICATIONS

Lisa Hoover, "Fonolo Skips Automated Customer Service Phone Trees, Now on iPhone", http://lifehacker.com/5470697/fonolo-skips-automated-customer-service- . . . , pp. 1-2.

(Continued)

*Primary Examiner* — Harry S Hong
(74) *Attorney, Agent, or Firm* — Volentine & Whitt, PLLC

(57) ABSTRACT

A method includes: determining that an agent-assisted service session should be initiated between a user and a human agent at some point after the user has initiated a user session, wherein the user session produces user session data; generating one or more temporary agent access numbers through which a communication channel may be established between the user and the human agent for the agent-initiated session; communicating a selected one or more of the temporary agent access numbers to the user in response to the determination that an agent-assisted service session should be initiated; establishing a communication channel for the agent-assisted session between the user and the human agent via a particular agent access number among the selected one or more temporary agent access numbers; associating the user session data with the agent-assisted session; and communicating the user session data to the human agent in conjunction with the agent-assisted session.

16 Claims, 19 Drawing Sheets

(56) References Cited

U.S. PATENT DOCUMENTS

| | | |
|---|---|---|
| 2011/0047221 A1 | 2/2011 | Watanabe et al. |
| 2011/0103559 A1 | 5/2011 | Andrews et al. |
| 2011/0293077 A1 | 12/2011 | Dubut et al. |
| 2012/0008755 A1 | 1/2012 | Mittal |
| 2012/0022938 A1 | 1/2012 | McNea et al. |
| 2012/0044932 A1 | 2/2012 | Sidhu et al. |
| 2012/0069976 A1 | 3/2012 | Tischer et al. |
| 2012/0129514 A1 | 5/2012 | Beenau et al. |
| 2012/0190333 A1 | 7/2012 | Portman et al. |
| 2012/0214516 A1 | 8/2012 | Rosenberg |
| 2012/0237009 A1 | 9/2012 | Szpilfogel |
| 2012/0260194 A1 | 10/2012 | Kennedy et al. |
| 2012/0265694 A1 | 10/2012 | Tuchman et al. |
| 2012/0265695 A1 | 10/2012 | Tuchman et al. |
| 2012/0265696 A1 | 10/2012 | Tuchman et al. |
| 2012/0265697 A1 | 10/2012 | Tuchman et al. |
| 2012/0265800 A1 | 10/2012 | Tuchman et al. |
| 2012/0266258 A1 | 10/2012 | Tuchman et al. |
| 2012/0309351 A1 | 12/2012 | Dutta |
| 2012/0320903 A1 | 12/2012 | Ilagan |
| 2013/0003957 A1 | 1/2013 | Singh et al. |
| 2013/0038519 A1 | 2/2013 | Bi et al. |

OTHER PUBLICATIONS

"Groupama releases the <<Groupama toujours là>> iPhone application", Jan. 3, 2011, http://www.sqli.com/eng/news/Press-releases/Groupama-releases-the-Gr . . . , pp. 1-2.

* cited by examiner

SYSTEM AND METHOD FOR IDENTIFYING A CALLER VIA A CALL CONNECTION, AND MATCHING THE CALLER TO A USER SESSION INVOLVING THE CALLER

BACKGROUND AND SUMMARY

This invention pertains to the field of self-service processes, systems, and applications.

In some aspects, the present invention is directed to a system and method for self service, call routing, and intelligent transition from self service to agent-assisted service.

In other aspects, the present invention is directed to a system and method for identifying a caller via a voice (e.g. telephone) and/or video call connection, and matching the caller to a web interaction or "user session" involving the caller. More particularly, in these other aspects the present invention may comprise an arrangement which may utilize web components, a server, and unique agent contact numbers (e.g., one or more telephone numbers, one or more uniform resource locators (URLs), and/or one or more session initiation protocol numbers (SIPs)) to uniquely identify and match a user's web interaction with their voice and/or video interaction with a human agent.

Automated telephone-based customer support systems, such as auto attendant (AA) systems, (which may also be referred to as automated attendant systems, virtual receptionist systems, interactive voice response (IVR) systems, AA/IVR systems, and other names) have evolved from relatively simple devices to more complex computerized systems for handling calls pertaining to a variety of issues. Modern AA systems can often allow a caller to resolve an issue through self service, without the need for a human agent to provide agent-assisted service. And in cases where agent-assisted service is required to address a caller's issue, an AA system may facilitate connecting the caller to the appropriate agent for resolving the issue.

For example, an AA system may automatically answer a telephone call from a caller, play a standard message to the caller, and then await a response from the caller. In some AA systems, this response may come in the form of the caller depressing a particular telephone key, which often generates a standardized set of tones called Dual-tone multi-frequency tones (DTMF), and/or in the form of voice input for more sophisticated voice recognition systems. Based on the caller response, the system may process the incoming call appropriately to resolve one or more issues which prompted the caller to place the call.

Auto attendant systems often have a complex menu structure, via which an incoming caller may, for example, proceed through a complex decision tree, being presented with a series of recorded voice prompts (or generated voice prompts utilizing Text-To-Speech) and providing corresponding responses, in order to connect the incoming caller with a particular person, departmental function, or information to resolve the incoming caller's issue(s). Some AA systems operate using voice communication over traditional Public Switched Telephone Networks (PSTN), wireless radio infrastructure, and/or voice-over-IP technologies.

Many commercial owners or users of AA systems also operate websites which can provide additional information to a customer, and in this case, one or more voice prompts which are provided by the auto attendant system may encourage incoming callers to stop using the telephone-based AA system, and instead to switch to using a web browser to engage in a self service operation with a computer-based customer support system.

However, callers to an organization's telephone-based auto attendant system may experience frustration with unsuccessful IVR interactions or encounter long wait times during peak call periods. Computer-based customer support systems may provide (e.g., via a network) a broader range of automated information and with little or no wait times where a customer seeks a resolution to the customer's issue during a self service session. However, if the computer-based customer support system fails to allow the customer to resolve an issue, the customer may still need to speak with a customer service agent to resolve the issue.

Furthermore, if a user engages in a user session with a website (e.g., a self service session with a self service application hosted by the website) before it is determined that agent-assisted service is to be performed, it would be desirable to convey to the human agent user data generated during the user session ("user session data"), including for example, a history of the nodes of a decision tree which were traversed during the interaction of the user with a self service application. In that case, it would further be desirable to be able to uniquely identify and match a user's web interaction with that user's voice and/or video interaction with a human agent.

Accordingly, it would be advantageous to provide a system and method which supports self service, and which can facilitate and streamline the operation of a subsequent agent-assisted service session with a human agent, for example via telephony, web chat, web-based video, etc.

The present invention comprises a system and method for identifying a caller via a voice (e.g. telephone) and/or video call connection, and matching the caller to a web interaction or "user session" involving the caller.

In one aspect of the invention, a method of associating a particular user interaction with an access number, method comprises: determining that an agent-assisted service session should be initiated between the user and a human agent after the user has initiated a user session via a website, wherein the user session produces user session data that is stored in one or more memory devices; generating one or more temporary agent access numbers through which a communication channel may be established between a user and a human agent for the agent-initiated session; communicating a selected one or more of the temporary agent access numbers to the user in response to the determination that an agent-assisted service session should be initiated; establishing a communication channel between the user and the human agent via a particular agent access number among the selected one or more temporary agent access numbers, the communication channel being used for the agent-assisted session; associating the user session data with the agent-assisted session; and communicating the user session data to the human agent in conjunction with the agent-assisted session.

In another aspect of the invention, a non-transitory data storage medium has stored thereon instructions for causing one or more processors to execute a process. The process comprises: determining that an agent-assisted service session should be initiated between the user and a human agent after the user has initiated a user session via a website, wherein the user session produces user session data that is stored in one or more memory devices; generating one or more temporary agent access numbers through which a communication channel may be established between a user and a human agent for the agent-initiated session; communicating a selected one or more of the temporary agent access numbers to the user in response to the determination that an agent-assisted service session should be initiated; establishing a communication channel between the user and the human agent via a particular agent access number among the selected one or more temporary agent access numbers, the communication channel being used for the agent-assisted session; associating the user session data with the agent-assisted session; and communicating the user session data to the human agent in conjunction with the agent-assisted session.

DETAILED DESCRIPTION

In the description to follow an individual may be referred to as a "user," a "caller, or a "customer." It should be understand that these terms are used interchangeably, depending on context, to refer to an individual who has an issue which they wish to resolve. The issue may pertain to a technical problem that the individual is experiencing with a product or service provided by a company or organization, a need for information about a company or organization and/or its products or services, a billing problem, or any of a variety of other issues for which an individual may seek assistance through an AA system, and/or via an interaction with a self service application, and/or via agent-assisted support.

Figure 1A:
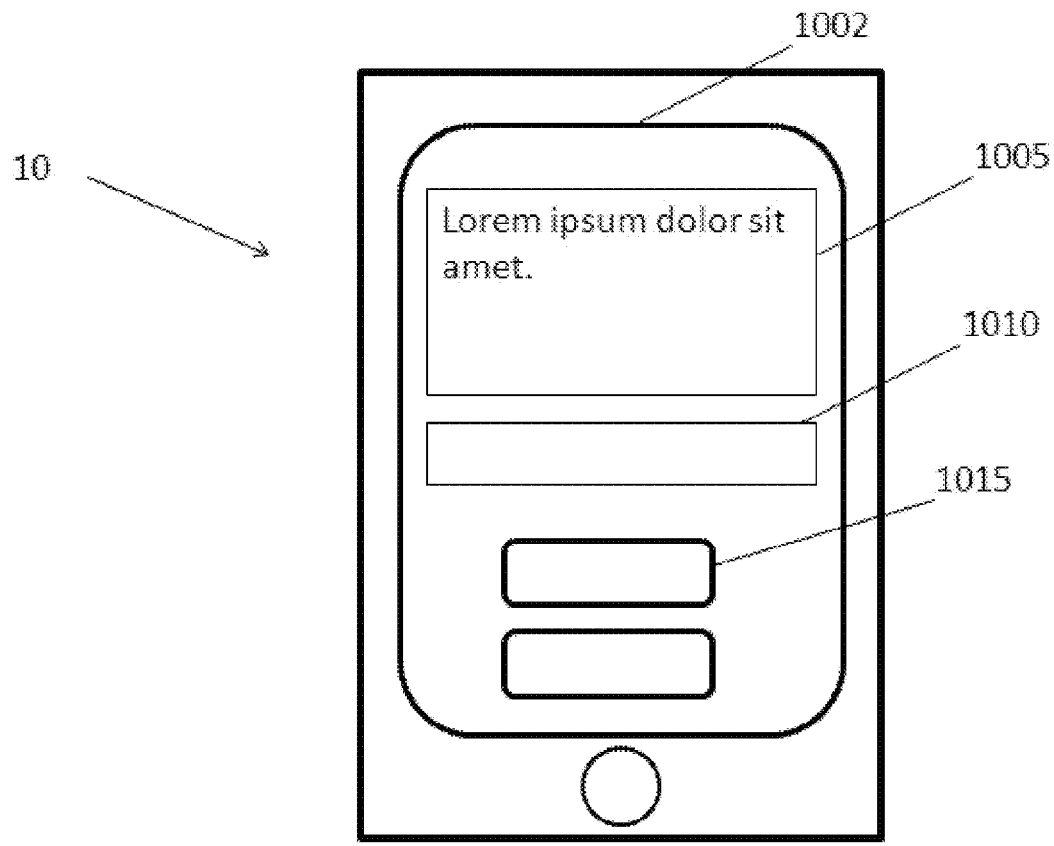
FIG. 1A illustrates one embodiment of a self service access terminal for a user to interact with a self service operation.

FIG. 1A illustrates one embodiment of a self service access terminal 10 for a user to interact with a self service operation. In this embodiment, self service access terminal 10 comprises a "smart phone" or a tablet or pad computing device. In other embodiments, self service access terminal 10 may comprise any other type of mobile device capable of running programs and communicating over a HTTP or TCP/IP connection.

Self service access terminal 10 includes a display device, one or more processors, memory, and one or more user input devices, which may include a touch screen, a keypad, a microphone, a keyboard, a trackball, a mouse, and/or any other known input device. The memory may comprise a non-transitory data storage medium and may have stored thereon instructions for causing the processor(s) to execute a process for supporting an interaction of a user with a self service application, as described in greater detail below.

In some embodiments, self service access terminal 10 may include an antenna, a transmitter, and a receiver for communicating over a wireless network. In some embodiments self service access terminal may be capable of voice calls and/or data communication over a wireless network, for example a 3G or 4G network. In some embodiments, self service access terminal 10 may include a wireless local area network (WLAN) adaptor and antenna for communicating via a WLAN, such as an IEEE 802.11 network. In some embodiments, self service access terminal 10 may be able to establish an Internet connection via either a wireless network (e.g., a 3G or 4G network) and/or over a WLAN.

In more detail, FIG. 1A depicts a user interface and application with the ability to render or display various UI controls including, but not limited to, text areas 1005, input fields 1010 and virtual buttons 1015. Other embodiments may include the ability to render commonly accepted UI elements, including but not limited to listboxes, combo-boxes, multi-select, scrollable lists and so forth.

In operation, still referring to FIG. 1A, a user may navigate through a series of user interface screens (UI screens) 1002 which are displayed on a display device of self service access terminal 10, selecting various controls available via the various UI screens 1002 in order to resolve a specific issue, i.e., perform a "self-service interaction" with a self service application which may reside in whole or in part in one or more memory devices of self service access terminal 10 and/or a remotely located self service server (which will be described in greater detail below). UI screens 1002 are updated in response to user input received via UI screens 1002 until such time that user's issue has been resolved or until such time that the user chooses to communicate with a contact center agent for agent-assisted service to resolve the user's issue. In some embodiments, by the series of actions of presenting a UI screen 1002 to a user, receiving user input in response to the UI screen, and presenting a new UI screen 1002 in response to the user input, a user may traverse through nodes of a decision tree or call tree of a self service application with which the user interacts, where each node has associated therewith a corresponding UI screen 1002. Here it should be noted that a decision tree is a logical construct rather than a physical entity, and represents an abstraction of a complex algorithm which includes a plurality of optional paths which may be followed by a user while engaged in a self service session to resolve an issue. In some embodiments, data representing such a decision tree (e.g., metadata) may be stored locally in memory of self service access terminal 10, while in other embodiments, self service access terminal 10 may execute a client-server session with a remotely located self service server, where the data representing the decision tree is stored in a database, and which communicates data for the UI screen associated with each node of the decision tree to self service access terminal 10.

Still referring to FIG. 1A, buttons 1015 may exist on UI screen 1002 to allow a user at any time during the interaction with the self service application to request an agent-assisted service session to resolve the user's issue. The agent-assisted service session may take place via a voice call, or via a web chat with an agent at a call center. Additionally, in some embodiments a button 1015 may allow the user to request a call back from the call center agent. Here, a "Call" refers to establishing a voice connection to a call center agent, either via regular "phone" channel (e.g., the public switched telephone network (PSTN)) if self service access terminal 10 includes the capability for such phone calls, or via a voice-over-Internet-protocol (VoIP) client installed and running on self service access terminal 10. In some embodiments, buttons 1015 allowing the user to place a call to an agent may additionally display the expected hold time that user would experience if calling or web chatting with an agent at the contact center.

Figure 1B:
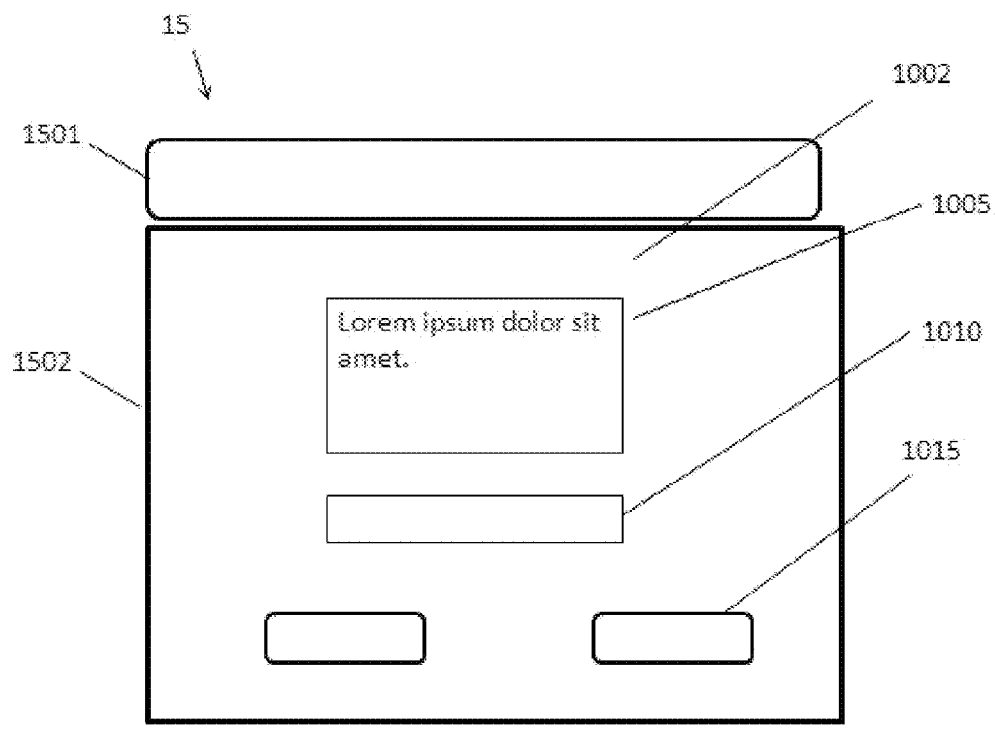
FIG. 1B illustrates another embodiment of a self service access terminal for a user to interact with a self service operation.

In some embodiments, when self service access terminal 10 is executing the self service application in a standalone mode and does not presently have access to a communication channel for an HTTP or TCP/IP communication session (e.g., not presently able to access the Internet), then the user may initiate a call to the call center agent via a separate telephone device. In that case, UI screen 1002 may notify a user of a unique ID assigned to the user's current interaction with the self service application, and an AA system to which the user connects via the separate telephone device FIG. 1B illustrates another embodiment of a self service access terminal 15 for a user to interact with a self service operation. Self service access terminal 15 may include, but is not limited to, a set-top box 1501 connected to a display device 1502 such as a television display. Self service access terminal 15 includes one or more processors and memory. Here, it is understood that set-top box 1501 is capable of rendering a user interface via a connected display device 1502. Alternate embodiments may include, but are not limited to: kiosks, point of sale terminals, ATM's, etc.

In some embodiments, self service access terminal 10 or 15 may have associated therewith a variety of sensors and/or data gathering devices, such as a global positioning system (GPS) receiver, a camera, a card swipe or near field readers, and/or other sensors.

In the description to follow, detailed examples and descriptions will be provided in the context of a user employing self service access terminal 10, in particular a smart phone. However, as noted above, it should be understood that a variety of other devices or platforms may be employed for the self service access terminal, without loss of generality.

Figure 2:
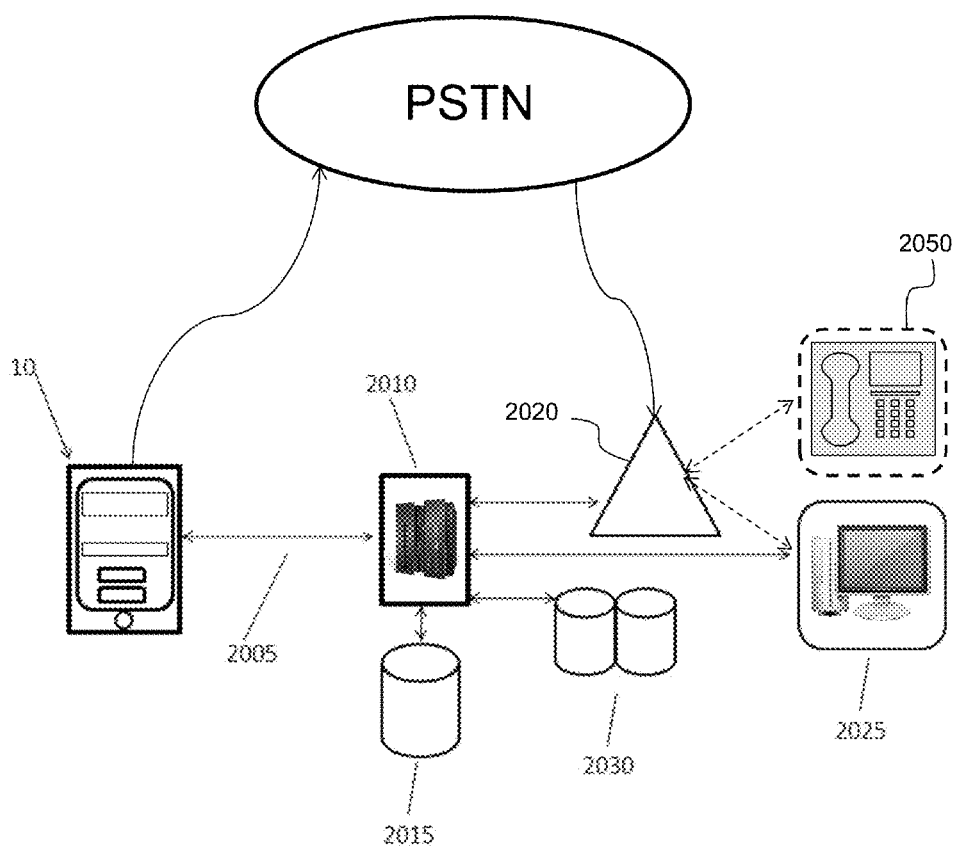
FIG. 2 illustrates an embodiment of a system for supporting self service, and for subsequent call routing for agent-assisted service.

FIG. 2 illustrates an embodiment of a system 20 for supporting self service, and for subsequent call routing for agent-assisted service. System 20 includes self service access terminal 10, self service application server 2010, a self service application database 2015, a computer telephony integration (CTI) server 2020, agent computer 2025, line of business (LOB) application(s) 2030, and optionally an agent telephone 2050. Self service application server 2010 includes one or more processors and memory. In some embodiments, the memory comprises a tangible, non-transitory, data storage medium and may have stored thereon instructions for causing the processor(s) to execute a process for supporting an interaction of a user with a self service application, as described in greater detail below. In some embodiments, self service application server 2010 may include a network adaptor or interface for allowing self service application server 2010 to communicate via the Internet.

Referring now to FIG. 2, there is shown a mobile device as one possible embodiment of self service access terminal 10 by means of which the user conducts an interaction with a self-service application. The self-service application executing on self service access terminal 10 retrieves the next step in the self-service process from self service application server 2010 utilizing either an HTTP or TCP/IP connection 2005 (e.g., via the Internet). HTTP connections are by definition stateless and one or more embodiments of the invention support stateless and stateful operations based on the underlying protocol. Self service application server 2010 receives requests from self service access terminal 10, processes logic, retrieves data for the next node of a decision tree or call tree from self service application database 2015, and returns data associated with the next node to self service access terminal 10.

In an alternate embodiment, the self-service application resides on self service access terminal 10 which is able to cache the interaction steps, minimizing round-trips communications with self service application server 2010. In such a cached deployment, a user may be able to navigate through the entire self service session, or a subset of such session, without communication back to self service application server 2010, allowing for operation in a disconnected or "offline" mode wherein self service access terminal 10 is not in communication from the self service application server 2010 and indeed may performs the steps of navigating the decision tree for a self service session without any communication with any external device. In that case, self service access terminal 10 may store in a memory device thereof metadata for the processor(s) of self service access terminal 10 to present the self service application to user as series of UI screens 1002.

In some embodiments, self service application server 2010 can optionally interact with and integrate with Line of Business ("LOB") applications 2030 to retrieve relevant customer or supporting information, including but not limited to customer information pertaining to customer information systems, billing data pertaining to billing systems, and knowledgebases. Data from LOB application(s) 2030 can affect logic flow in self service application server 2010 and return the results (or interpretation of the results) back to self service access terminal 10. Data from LOB application(s) 2030 may also be proactively pushed by self service application server 2010 to self service access terminal 10 without requiring the user to have initiated the request.

In some embodiments, self service application server 2010 can optionally interact with CTI server 2020 in order to initiate a call/voice/chat session with an agent (depicted in further detail in FIG. 11) or to determine current hold times or to initiate a call-back request. CTI server 2020 may be supplied by various vendors.

In some embodiments, self service application server 2010 can interface to and integrate with the applications running on the agent computer 2025 to communicate to agent computer 2025 data associated with a user's interaction with the self service application. Examples of such integration to agent computer 2025 may include, but are not limited to: providing a "screen-pop" of incoming caller information to an agent using once the user of self service access terminal 10 requests to place a voice call to the contact center; providing a detailed history of the sequences performed by user on self service access terminal 10 and the self-service interaction including the pages generated by self service application server 2010, and data retrieved from LOB applications 2030. In some embodiments, the agent is able to see on agent computer 2025 a full "call path" or interaction history or "Call Navigation Path" performed by the user of self service access terminal 10 prior to (or simultaneously with) establishing the voice connection.

In some embodiments, whenever a user initiates an interaction through system 20, the a unique ID ("Interaction ID") is assigned to the interaction, and the interaction state, context, data and steps performed are continually saved on self service application server 2010 and retrievable by this unique Interaction ID. The Interaction ID may be used to retrieve the details at a later time and may also be used to continue or "restart" an interaction at a later time by restoring the context, state and data entered previously.

Figure 3:
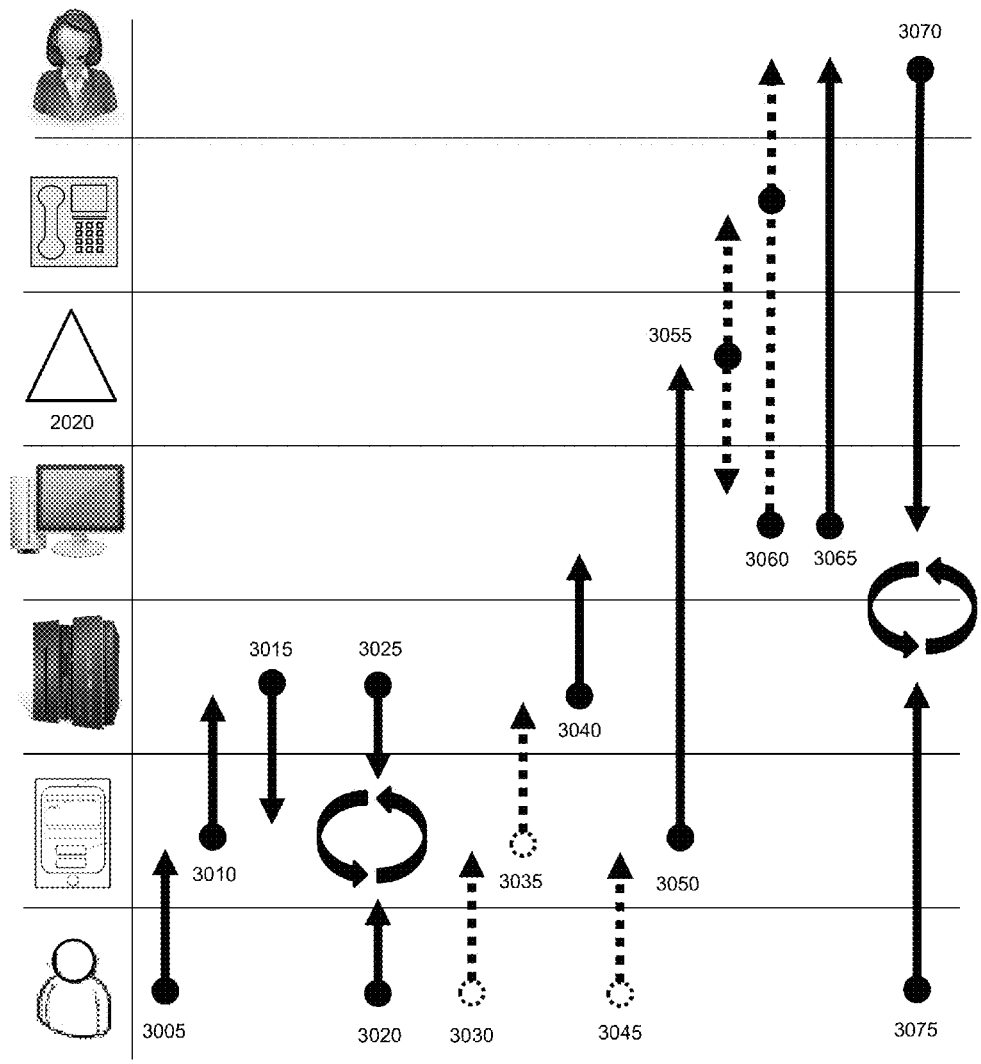
FIG. 3 illustrates a logical sequence flow for an example a self service interaction with one embodiment of a self service application followed by agent-assisted service.

FIG. 3 illustrates a logical sequence flow 30 for an example a self service interaction with one embodiment of a self service application followed by agent-assisted service.

An initial self service session may be initiated by a user starting or launching a self service application via self service access terminal, depicted in FIG. 3 by process 3005. In some embodiments, self service access terminal 10 establishes contact with self service application server 2010 and downloads data associated with a first page or UI screen 1002 of the self service application, depicted by processes 3010 and 3015. The first page or UI screen 1002 may be associated with a node (e.g., a starting node) of a decision tree (see FIG. 8) associated with the self service application. Self service application server 2010 may determine the best starting node for a particular interaction with the self service application based on any number of business rules, including, but not limited to, previous interaction data and results, data collected from LOB systems, current Contact Center agent availability, and/or the current state of self service access terminal 10.

Self service access terminal 10 may display the first UI screen 1002 on a display device (e.g., a touch screen) associated with self service access terminal 10. The user may interact with the self service application via self service access terminal 10 by selecting an appropriate option or button presented on the UI screen 1002, or otherwise by providing user-supplied input, as depicted in process 3020. In some embodiments, at all times during the process 3020 self service access terminal 10 may communicate to self service application server 2010 environmental data gathered from one or more sensors and/or data gathering devices associated with self service access terminal 10, such as GPS data, image data, a card swipe data, etc. User selection of an option via UI screen 1002 may initiate communication of the user-supplied input from self service access terminal 10 to self service application server 2010 where self service application server 2010 may store the user-supplied input in self service application database 2015, for example in a data file associated with a unique Interaction ID for this particular self service session. Furthermore, based at least in part on the user-supplied input, self service application server 2010 may navigate the decision tree to reach a next node of the decision tree. The next node may a UI screen 1002 associated therewith, and self service application server 2010 may communicate self service data associated with that UI screen 1002 back to self service access terminal 10, as depicted by process 3025. In some embodiments, at all times during the process 3025 the self service application server 2010 may have the ability to connect to LOB application(s) 2030 to retrieve data (e.g., customer data or business data) and communicate this data to self service access terminal 10. Processes 3020 and 3025 may repeat until the problem has been resolved (a completed self-service interaction) or until a node in the decision tree is reached which indicates that an agent-assisted service session should be initiated between the user and a human agent.

An endpoint in the decision tree may be reached by the user ending the self service session.

A node in the decision tree indicating that an agent-assisted service session should be initiated between the user and a human agent may be reached in various ways, including for example the receipt of user-supplied input via a UI screen 1002 whereby the user requests a call back or that the self service application initiate a call to an agent, or by the user placing a call to a call center agent, or by a "dead-end" in the decision tree where the designer of the self service application has determined that resolution of the problem will require an agent-assisted service session.

In some cases, the user may initiate an agent-assisted service session via a button of a UI screen 1002 of the self service application as displayed on the display device of self service access terminal 10, depicted in FIG. 3 by an optional process 3030. In that case, the user-supplied input initiating the agent-assisted service session may be communicated from self service access terminal 10 to self service application server 2010, depicted in FIG. 3 by an optional process 3035. In other cases, the design of the decision tree for self service application may include or more nodes where an agent-assisted service session is initiated automatically by the self service application. In some embodiments, when an agent-assisted service session is to be initiated, a user may be presented with an option, via a UI screen 1002, to place a call immediately, or to request a call back from an agent when the agent becomes available. In order to assist a user in making a decision as to whether to place a call or to request a call back from an agent, in some embodiments self service application server 2010 is able to integrate with CTI server 2020 to determine an approximate current wait or hold time based on the particular queue or agent group which is needed to resolve a particular issue.

Regardless of whether a user requests a call-back, whether a call is initiated by the user manually or automatically by the self service application, self service application server 2010 communicates data associated with the user's interaction with the self service application to agent computer 2025 which displays information to the human agent, depicted in FIG. 3 as a process 3040. The data may include user data, environmental data, and/or a detailed interaction data representing a history of the nodes of the decision tree which were traversed during the interaction of the user with the self service application. Further, in some embodiments, technology may allow automation of entering data received into applications running on agent desktop in order to reduce handling time by the agent 2025.

In some embodiments, to initiate an agent-assisted session, a call may be automatically placed from self service access terminal 10 to CTI server 2020. In other embodiments, a user may manually initiate the call via self service access terminal 10, depicted in FIG. 3 as an optional process 3045. In still other embodiments where self service access terminal 10 is not able to be connected to CTI server 2020, a user may place the call using a separate telephone. As explained above, the call may be conducted over a standard phone channel via the PSTN, or using VoIP.

Regardless of the method, a call connection is established between self service access terminal 10 and CTI server 2020, depicted in FIG. 3 as process 3050. CTI server 2020 routes the call to the agent telephone 2050 and/or agent computer 2025, depending on the nature of the call (PSTN, VoIP, etc.) and the CTI server 2020, as depicted in FIG. 3 as process 3055. The agent processes the call via agent telephone 2050 and/or agent computer 2025, depicted in FIG. 3 as process 3060. Also, via agent computer 2025 the agent accesses the data associated with the user's interaction with the self service application, including for example user data, environmental data, and/or a detailed interaction data representing a history of the nodes of the decision tree which were traversed during the interaction of the user with the self service application, depicted in FIG. 3 as process 3065. Finally, the agent and the user communicate with each other to resolve the user's issue, depicted in FIG. 3 as processes 3070 and 3075.

Figure 4:
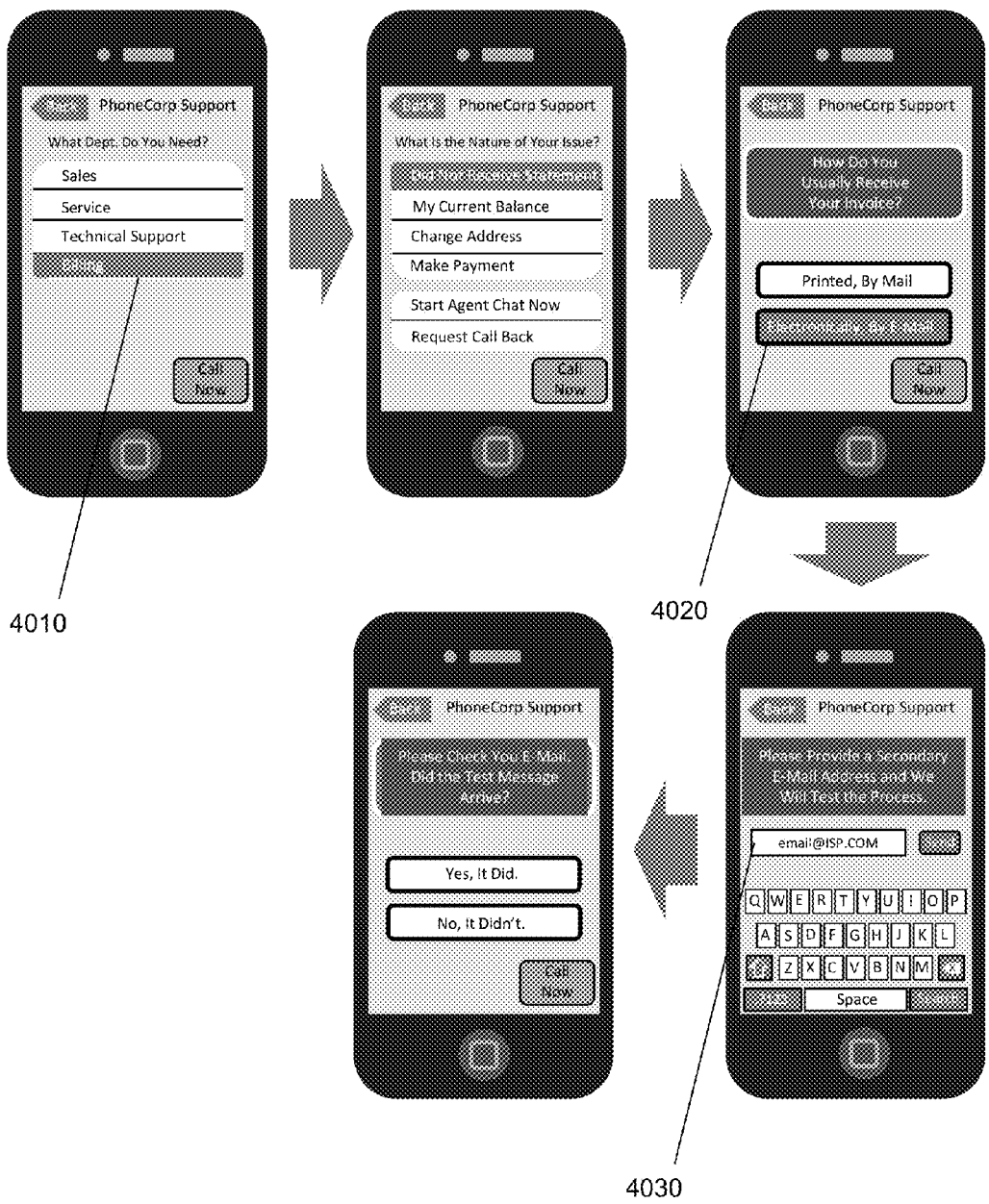
FIG. 4 depicts an example of an interaction with a self service application via a mobile device operating as a self service access terminal.

FIG. 4 depicts an example of an interaction 40 with a self service application via a mobile device operating as a self service access terminal.

In the example, a user may be prompted with choice lists to select the nature of the self service interaction 4010, choice buttons 4020, and user also has the ability to enter alphanumeric data 4030.

Figure 5:
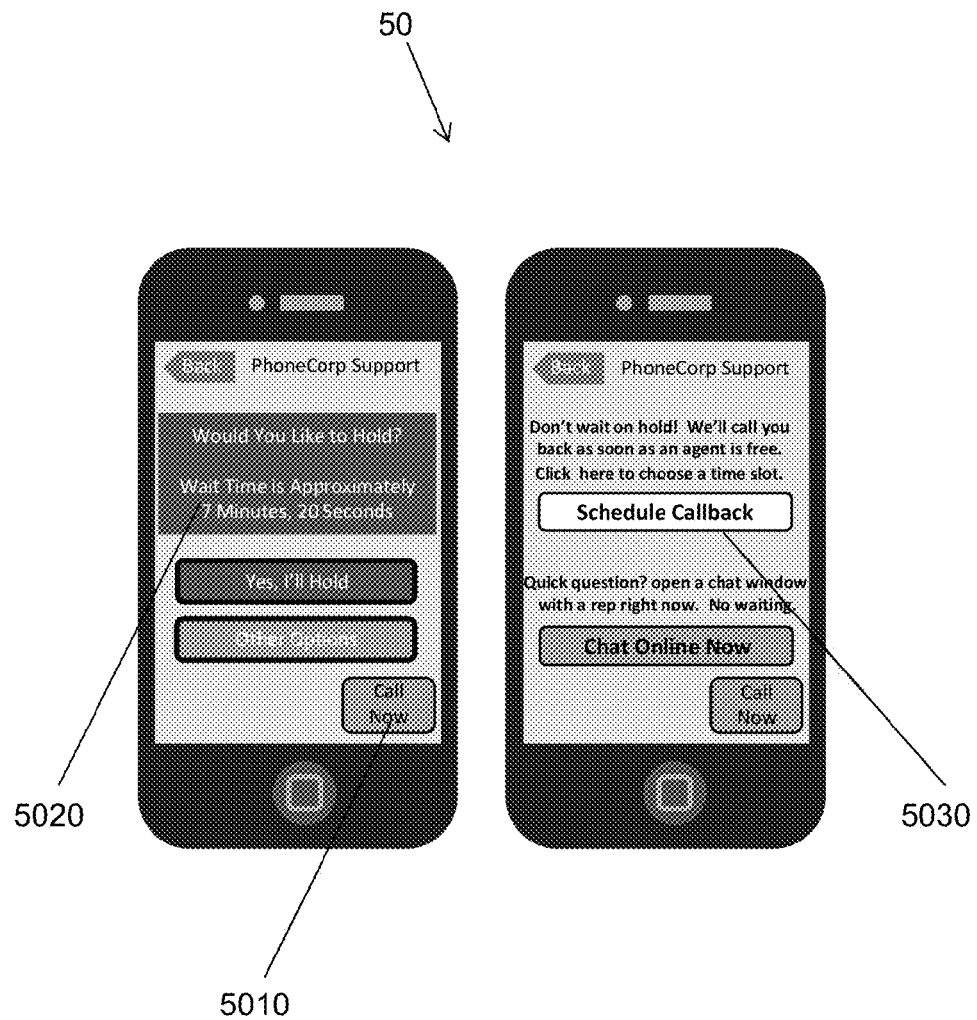
FIG. 5 depicts an example of an operation whereby a user of a mobile device operating as a self service access terminal may request a call-back or place a call and receive information about the waiting time.

FIG. 5 depicts an example of an operation 50 whereby a user of a mobile device operating as a self service access terminal 10 may request a call-back or place a call and receive information about the waiting time. The user may at any time select the Call Now option 5010 displayed on a display screen of self service access terminal 10 via a UI screen 1002. Prior to selecting Call Now option 5010, or after having already selected the Call Now option, the user can be informed of the current wait time and be asked if they would like to execute a Hold option 5020. Existing telephony infrastructure may be employed to determine hold times. Alternatively, the user may choose, because of long hold or wait times or, for other reasons, to request a call back and can select this option 5030. In that case, a scheduler may be provided to allow the user to request a convenient time slot for the call back, again, working in coordination with the existing telephony system for available times.

Figure 6:
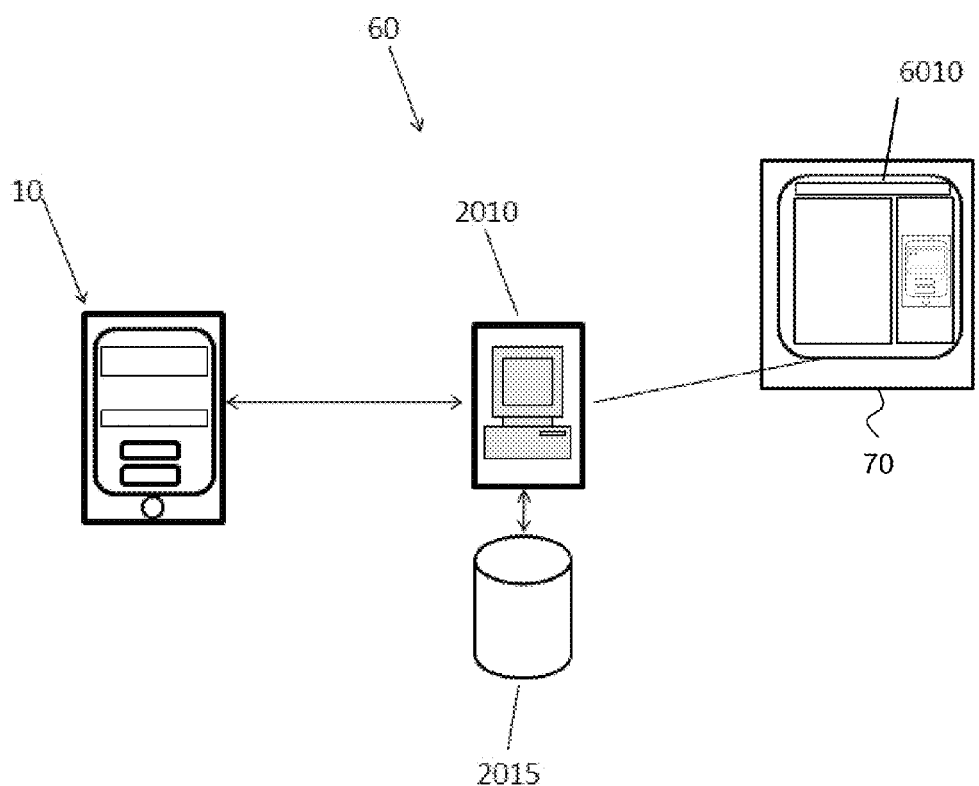
FIG. 6 depicts an example embodiment of a logical architecture for a designer application executing on a designer terminal to publish to a self service application server.

FIG. 6 depicts an embodiment of a logical architecture 60 for a designer application 6010 executing on a designer terminal 70 to publish a self service application to self service application server 2010. Designer 6010 may be provided as a graphical tool allowing call scripts to be created. These call scripts may be published to self service application server 2010 where they may be retrieved by self service access terminal 10 on each execution of the self service application and/or script, or alternatively to be cached within memory of self service access terminal 10 for standalone operation.

Figure 7:
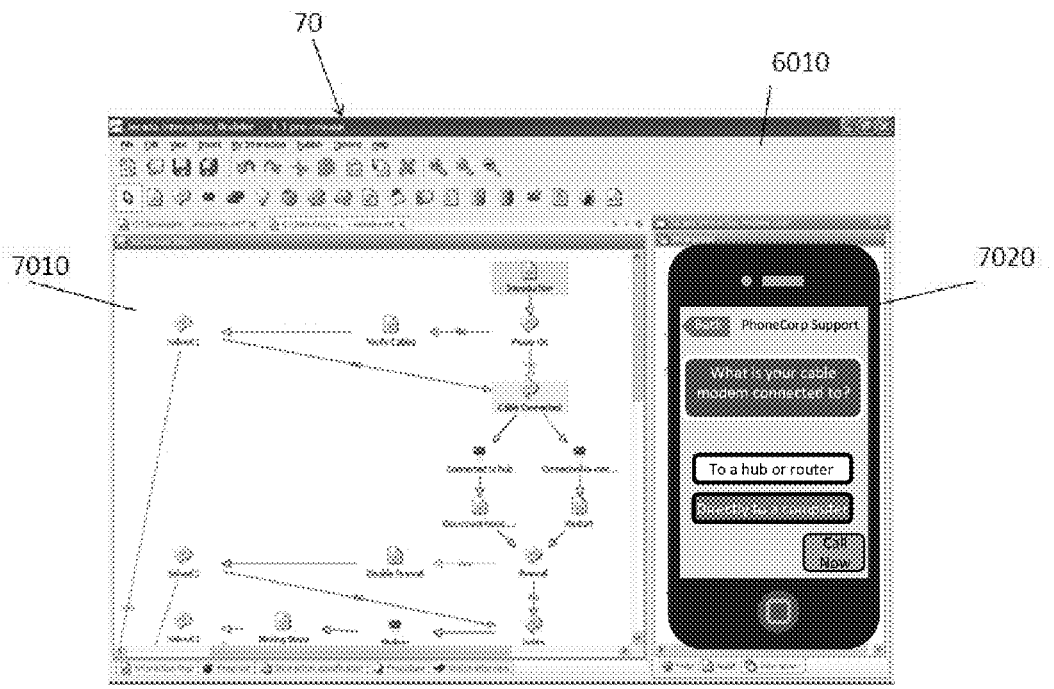
FIG. 7 depicts an example embodiment of a designer terminal executing an embodiment of a designer application for designing a self service application.

FIG. 7 depicts an example embodiment of a designer terminal 70 executing an example embodiment of a designer application 6010 for designing a self service application. In some embodiments, designer application allows a self service application to be created with a modular design comprising a plurality of separate modules ("call scripts") with defined boundaries which interconnect with each other to form a self service application Referring now to FIG. 7, there is shown an example of how designer 6010 may appear visually to an author of a self service application or a call script for the self service application. The design environment allows the author to drag and drop visual nodes depicting the call flow and the options emanating from each point in a decision tree on a canvas 7010. Furthermore, the author may see a preview of the self-service interaction in a Window 7020 in designer 6010, representing a self service access terminal 10. Call scripts and self service applications can be tested before deploying them to self service application server 2010.

Figure 8:
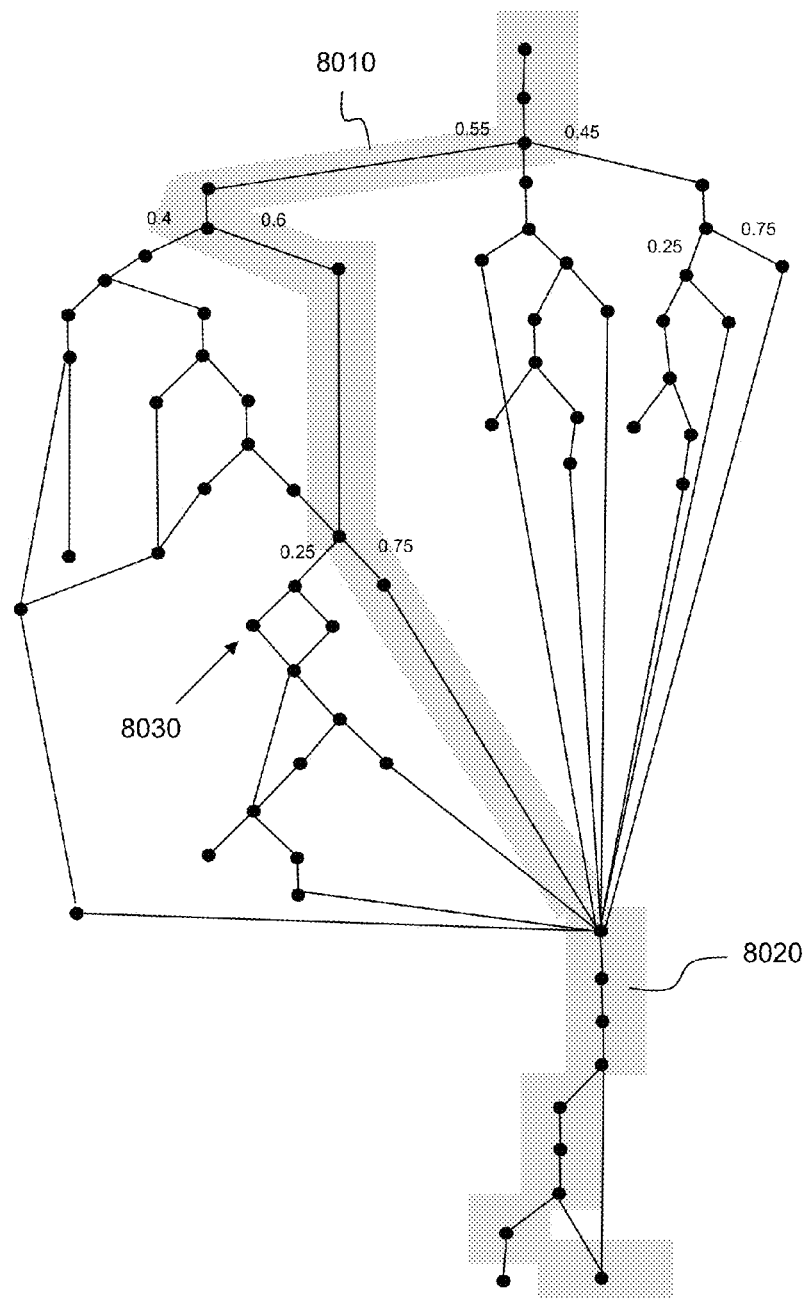
FIG. 8 depicts an example embodiment of a decision tree and some analytics for the decision tree that may be produced according to one embodiment.

FIG. 8 depicts an example embodiment of a decision tree or call tree 80 and some analytics for decision tree 80 which may be produced according to one embodiment. The analytics include, but are not limited to, the ability to see the path 8010 which most users traverse, the specific nodes 8020 in the call path that take the most time to complete, the points 8030 within the decision tree where most customers abandon the interaction with the self service application, the relative percentages for which each alternative path is followed from a parent node, etc. In some embodiments, data representing decision tree 80 (e.g., metadata) may be stored in memory of self service access terminal 10. In other embodiments, data representing decision tree 80 may be stored in self service application server 2010 or self service application database 2015 associated with self service application server 2010. In some embodiments, self service application server 2010 may maintain and calculate a detailed interaction history for all users, allowing an administrator or other operator to create reports and graphs that provide information that includes, but is not limited to: most frequently traversed paths and nodes, least frequently traversed paths and nodes, time spent at each node, drop-out rate at each node, etc.

Figure 9:
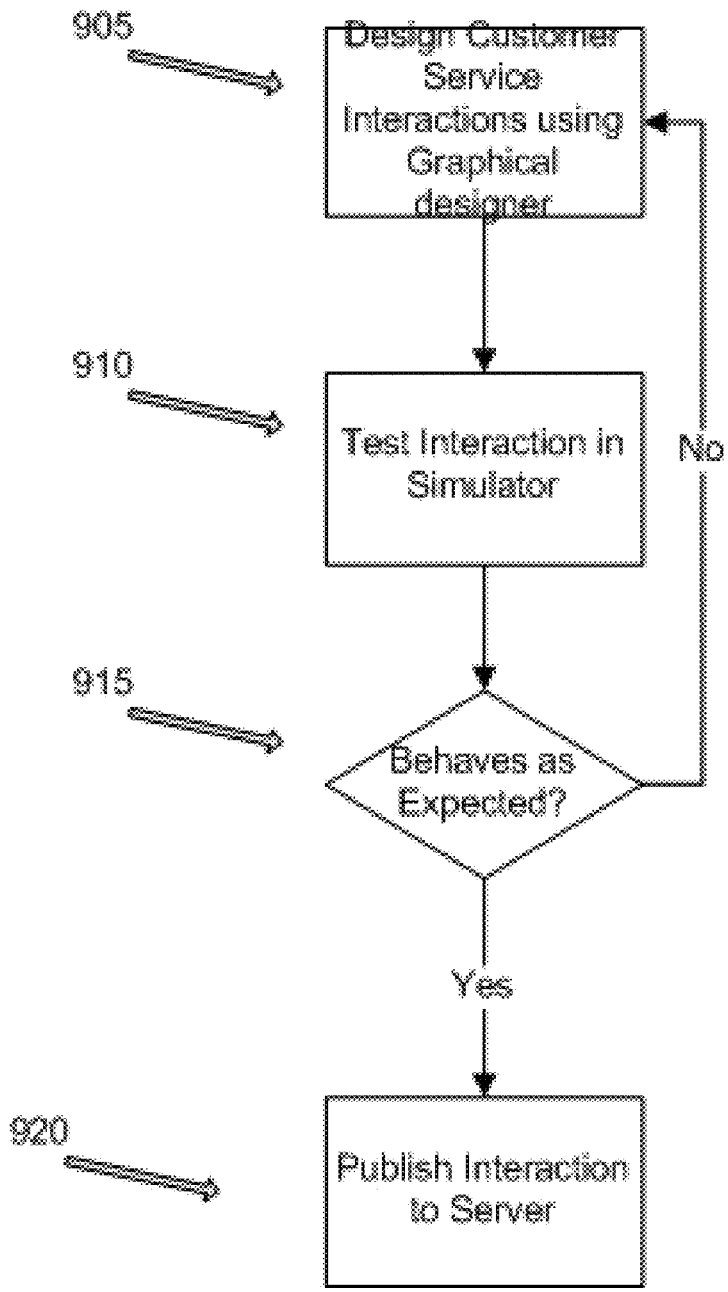
FIG. 9 is a flowchart depicting one embodiment of a method of creating a script for a self service application and publishing it to a self service application server.

FIG. 9 is a flowchart depicting one embodiment of a method 900 of creating a call script for a self service application and publishing it to a self service application server 2010. Here, it should be understood that the self service application may comprise several call scripts. A call script may be created in step 905 using graphical designer 6010, for example by dragging and dropping visual components on canvas 7010. The call script can be optionally tested 910 in a simulation mode before ever publishing it to self service application server 2010. If the call script is not behaving as expected 915 the author can make changes to the call script within designer 6010. If it is determined in a step 915 that the call script is behaving as expected, in a step 920 the author can select to publish this call script to the self service application server 2010 where it will remain in a Draft state waiting for approval before being made available to one or more self service access terminals 10. Publishing is described in further detail referencing FIG. 12.

Figure 10:
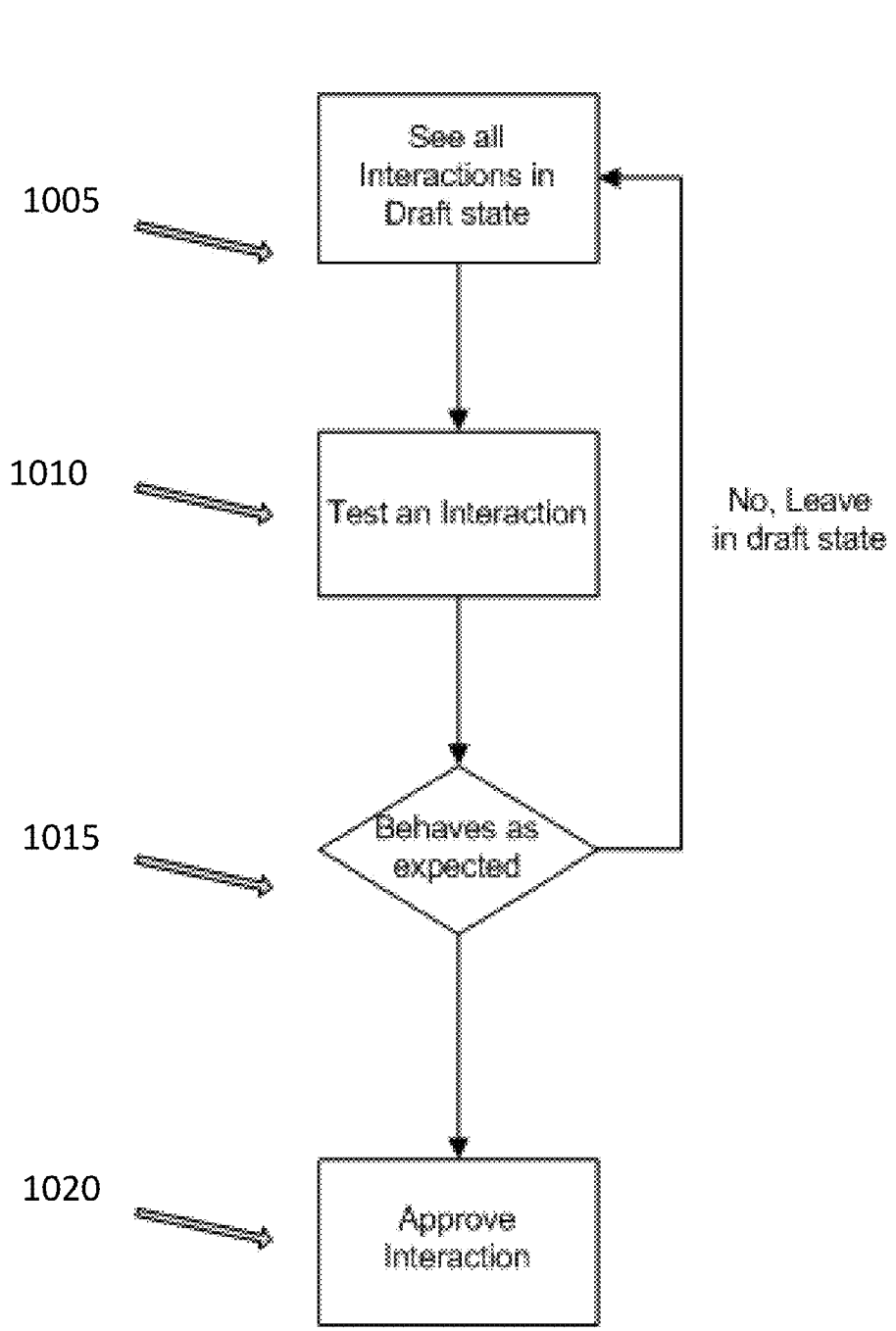
FIG. 10 is a flowchart depicting one embodiment of a method of approving a script for a self service application for deployment to one or more self service access terminal.

FIG. 10 is a flowchart depicting one embodiment of a method 1000 of approving a script for a self service application for deployment by self service application server 2010 to one or more self service access terminals 10. In a step 1005, a person (administrator) with the appropriate authorization and credentials may log into self service application server 2010 via an administration interface and see all of the call scripts which have been published from designer 6010, as described above with respect to FIG. 9. In a step 6010, the administrator may optionally test a call script directly within an administration interface to ensure that its behavior is as expected. If it is determined in a step 1015 that the behavior is not as expected, the call script will remain in draft state and not be made available to self service access terminal(s) 10. If the interaction behaves correctly, then in a step 1020 the administrator may mark the interaction as "Approved". In some embodiments, only approved call scripts are made available to a user of a self service access terminal 10. While this process depicts a simplistic workflow of advancing a call script from Draft to Approved, nothing herein should be construed to limit this to a two stage workflow. Multiple approval cycles and approval roles may be implemented to finally end up in an approval state.

Figure 11:
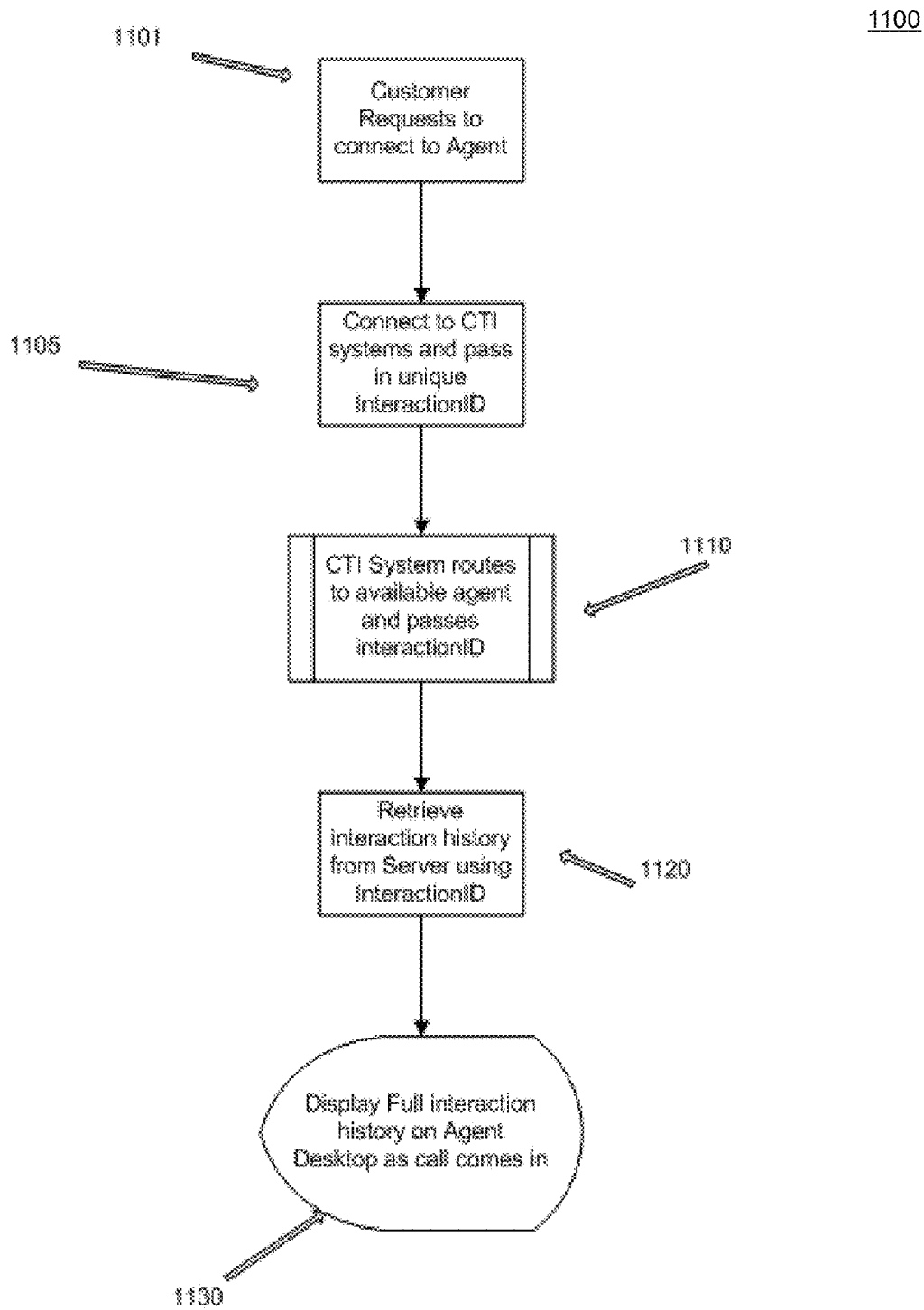
FIG. 11 is a flowchart depicting one embodiment of a method of establishing a voice call between a customer and an agent and communicating to the agent data associated with the user's interaction with the self service application.

FIG. 11 is a flowchart depicting one embodiment of a method 1100 of establishing a call between a user and an agent, and communicating to the agent data associated with the user's interaction with the self service application. In the discussion to follow, reference will be made to some elements shown in FIG. 13, which is discussed in greater detail below. In a step 1101, a user or customer requests a call with an agent to receive agent-assisted service. In a step 1105, self service application server 2010 establishes a connection to CTI server 2020 to pass a unique user session ID (element 13040 in FIG. 13) that identifies user session data (element 13043 in FIG. 13) associated with the user's interaction with the self service application. Such data may include user data, environmental data, and/or detailed interaction data representing a history of the nodes of the decision tree which were traversed during the interaction of the user with the self service application, and beneficially represents the state, context, data and steps performed during the user's interaction with the self service application. The data associated with the user's interaction with the self service application is maintained and saved on the self service application server 2010/13030 (see FIG. 13) (e.g., within the memory of the self service application server, on the file system of the self service application server or in the underlying self service application database 2015) and can be accessed or retrieved by the unique user session ID 13040. The specific mechanism used to pass the Interaction ID to CTI server 2020 depends on the specifications and operation of CTI server 2020. The specific implementation mechanism will be readily apparent to one skilled in the art and may include, but is not limited to, web service calls, API calls, REST calls or any integration technology. In a step 1110, CTI routing system 2020 routes the call to an appropriate agent, and passes the unique Interaction ID to the agent via agent computer 2025. The routing mechanism is within the domain of CTI server 2020. However, as disclosed herein, the routing of the call to agent computer 2025 by CTI server 2020 is enhanced to also pass the Interaction ID along with the voice call. This can be commonly performed through using "Attached Data" but can be accomplished by other means, too. Further, this is not meant to be limited to passing in the Interaction ID and could instead be implemented by passing some other key (such as the telephone number of self service access terminal 10, a customer number associated with the user/customer, etc.) and then through a mapping table retrieve the unique Interaction ID. In some embodiments, the CTI routing mechanism may be supplemented by employing additional data known about the user. In a step 1120, an application executing on the agent computer calls an API on self service application server 2010, passing in the unique Interaction ID and retrieving the data associated with the user's interaction with the self service application, as described above. In a step 1130, some or all of this data may be displayed to the agent by agent computer 2025.

Figure 12:
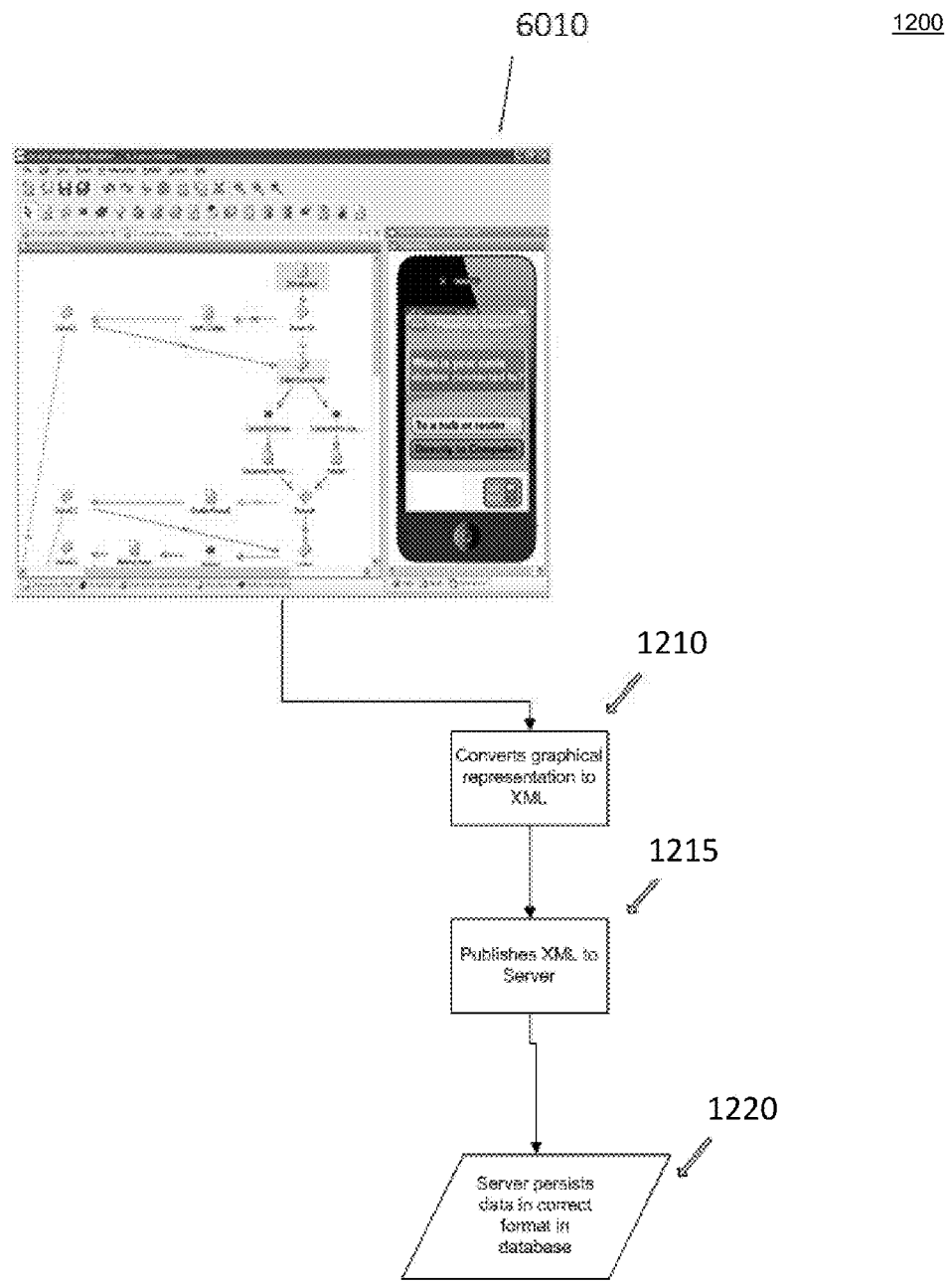
FIG. 12 depicts an embodiment of an operation of graphically creating a script for a self service application and publishing it to a self service application server.

FIG. 12 depicts an embodiment of an operation 1200 of graphically creating a call script for a self service application and publishing it to a self service application server 2010. In a step 1210, when the call script is published, the designer will encapsulate the "graphical script" in an internal meta-data such as XML. Alternate representations other than XML can also be used. In a step 1215, this metadata is then published to the self service application server 2010 over a suitable communication mechanism and API including but not limited to utilizing a Web service call over HTTP. In a step 1220, the self service application server 2010 receives the XML metadata and normalizes and persists the data in the underlying storage mechanism, for example self service application database 2015.

As discussed above, if a user engages in a user session (e.g., a self service session with a self service application) and it is subsequently determined that agent-assisted service is to be performed, it would be desirable to convey to the human agent data generated during the user session ("user session data"). This may include in various embodiments: user interactions with a website; a history of the nodes of a decision tree which were traversed during the interaction of the user with a self service application; etc. In that case, it would further be desirable to be able to uniquely identify and match a user's web interaction, for example, with that user's voice and/or video call to, and interaction with, a human agent.

In some embodiments, as will be described in greater detail below, an arrangement of components to meet this need may include a user interaction server, an application programming interface (API), an optional web tracking component, an optional web display component, a temporary agent access number pool (e.g., temporarily telephone number pool), and telephony elements. In some embodiments, a website may use the API or web tracking component to track and monitor certain user interactions with the website, and to store, on the user interaction server, user session data representing these interactions. Alternatively, the website may track and monitor the user's interactions with existing tools, and use to the API to store, on the user interaction server, user session data representing the user's interactions. The web display component or API can also be used by the website to receive a temporary access number, such as a temporary phone number, or a contact number such as an IP address, SIP contact or other, from the user interaction server to display to the user. The temporary phone number may be reserved in the user interaction server for the user for a configurable period of time.

When the user calls the provided temporary number, the user may be identified based on the unique number assignment. The identification of the user enables the user interaction server to match the user with their website session, and any user session data that was stored for that user session (e.g., session of interaction(s) with a website). At this time, the temporary number is released and available for re-use with a different user. This allows the customer interaction to start in-context and with relevant background information, as the user has already been identified. In some embodiments, the user can bypass the traditional IVR system if they have already performed self service prior to the voice call, and the human call center agent has visibility into what the customer had been doing via the website. Additionally, the prior knowledge of the details of the user activity via the website enables the telephone systems to make more intelligent choices regarding which agent should receive the user's call, to ensure an optimal business outcome. Note that alternate embodiments include initiating a video session/call (e.g., over an Internet connection) instead of a telephone call. Although a concrete example is described in detail in the context of a telephone call, this should not be construed as limiting to a voice call only and is representative of establishing some form of communication channel between the user and a human agent.

Figure 13:
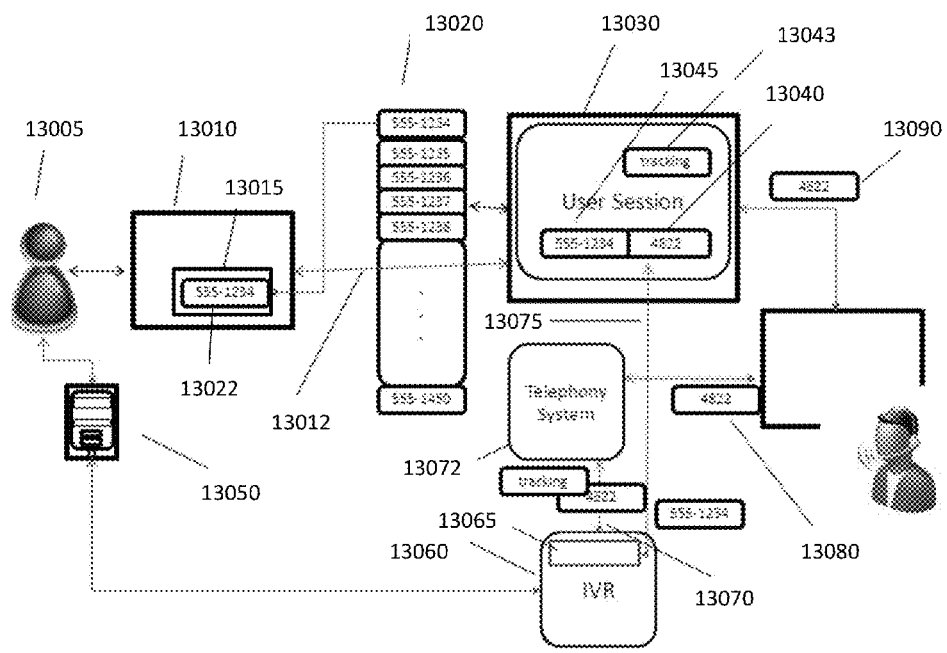
FIG. 13 depicts various components of one embodiment of an arrangement for supporting a user performing a user session with a website, and an agent assisted session with a human agent.

FIG. 13 depicts various components of one embodiment of an arrangement 13000 for supporting a user performing a user session with a website, and an agent assisted session with a human agent.

In particular, arrangement 13000 entails a customer or user 13005 navigating a website 13010. Here, website 13010 may be considered to comprise an interrelated group of World Wide Web pages, usually constructed using hypertext markup language (HTML) code, containing hyperlinks to each other and made available for access at corresponding uniform resource locator (URL) addresses via the Internet by an individual, company, educational institution, government, or organization. Website 13010 may be hosted via one or more web servers (see, e.g., element 14025 in FIG. 14) which may include a display device, one or more processors, memory, and one or more user input devices, which may include a touch screen, a keypad, a microphone, a keyboard, a trackball, a mouse, and/or any other known input device. The memory may comprise a non-transitory data storage medium and may have stored thereon instructions for causing the processor(s) to execute a process for providing website 13010 to user 13005. User 13005 may access website 13010 via a processing device such as a personal computer, a smart phone (e.g., IPHONE®), a smart pad (e.g., IPAD®), a television, a set-top box, a gaming console, a kiosk, a point of sale terminal, an ATM, etc. The processing device may include at least: a processor and associated memory; a display device for displaying the web pages of the website; a user interface (e.g., microphone with voice recognition software, touch screen, keyboard, trackball, mouse, etc.) for navigating the web pages of web site 13010; and a communication device for communication with the server(s) which host(s) website 13010.

At some point during the user interaction with website 13010, an API call may be made via an API 13012 to a user interaction server 13030, at which point a unique user session ID 13040 may be assigned or established. User 13005 may continue to access and navigate website 13010, and user session data 13043, which may include for example tracking and monitoring information of the interactions of user 13005 with website 13010, is sent back to user interaction server 13030 and associated with a user session ID 13040. This tracking and monitoring is more fully explained in FIG. 14 below. Here, user interaction server 13030 may include a display device, one or more processor(s), memory, and one or more user input devices, which may include a touch screen, a keypad, a microphone, a keyboard, a trackball, a mouse, and/or any other known input device. The memory may comprise a non-transitory data storage medium and may have stored thereon instructions for causing the processor(s) to execute one or more functions or operations of user interaction server 13030 as described herein.

In still more detail, referring still to FIG. 13, at a certain point within the user session (e.g., a session of interaction(s) with a website), it is determined that an agent-assisted service session should be initiated between user 13005 and a human agent.

In that case, user 13005 is provided with one or more selected temporary agent access numbers 13022 (e.g., one or more temporary telephone numbers) in order to contact a human agent, (e.g., via placing a voice call), and the one or more temporary agent access numbers may be displayed to user 13005 via website 13001, utilizing directly or indirectly a component 13015. The selected agent access number(s) (e.g., telephone number(s)) is/are received from the user interaction server 13030 as described below. Component 13015 may comprise a widget, JAVA® applet, or other component of a web page of website 13010, which, for example, may include a piece of code embedded in the HTML code for the webpage.

In some embodiments, user interaction server 13030 maintains a pool 13020 of agent access numbers (e.g., telephone numbers).

In still more detail, referring still to FIG. 13, when an agent access number (e.g., a telephone number) is to be made available to user 13005 via website 13010 or another vehicle, either: (1) component 13015; or (2) website 13010 without component 13015 (e.g., directly via API 13012), communicates with user interaction server 13030 and is provided with one or more selected temporary agent access number(s) 13022 from the pool 13020 of temporary agent access numbers. The obtained selected temporary agent access number(s) 13022 is/are then displayed via website 13010, either via component 13015 or as a return value from API 13012. The decision when to display the temporary agent access number(s) 13022 is based on any combination of using developer implemented logic, tying into a telephony server to obtain CTI "presence" information such as making sure a human agent is actually available, and using a rules engine. When user interaction server 13030 provides one or more selected temporary agent access number(s) from pool 13020 of temporary agent access numbers, user interaction server 13030 also matches user session ID 13040 with the selected temporary agent access number(s) 13022 in order to connect or associate the voice session with the web session 13045 or user 13005.

Still referring to FIG. 13, there is shown how user 13005 then uses a telephone (mobile or regular) 13050 to place a telephone call to the displayed temporary telephone number 13015 which is now uniquely assigned to user 13005. The call is typically received by an IVR system 13060. Through an IVR component 13065, IVR system 13060 is able to recognize the dialed number as being a selected temporary agent access number 13022. IVR component 13065 retrieves a unique user session ID 13040 and/or user session data 13043 that is associated with selected temporary agent access number 13022, in a process 13075. Usage of user session ID 13040 is optional and may allow the selected temporary agent access number 13022 to be recycled to the pool 13020 of temporary agent access numbers sooner. In configurations where no IVR system 13060 is present, IVR component 13065 may have an alternate embodiment that allows it to be executed on a telephony system 13072 and utilize substantially the same workflow as described herein. In addition other embodiments include supporting Video (and other calls). In such instances, IVR system 13060 may be a voice response unit (VRU) using substantially the same mechanism as described herein. In general, IVR system 13060 may include a display device, one or more processor(s), memory, and one or more user input devices, which may include a touch screen, a keypad, a microphone, a keyboard, a trackball, a mouse, and/or any other known input device. The memory may comprise a non-transitory data storage medium and may have stored thereon instructions for causing the processor(s) to execute one or more functions or operations of IVR system 13060 as described herein.

Based on user session data 13043 (e.g., tracking data), and optionally applying rules, IVR system 13060 can immediately place the inbound call 13070 in a defined call queue in telephony system 13072 at process 13070, and utilizing attached data or other protocol(s), associate (attach) the user session ID 13040 and/or user session data 13043 (which may include tracking data) to the inbound call 13070 using IVRS component 13065. In some embodiments, user 13005 may not be presented with the typical IVR greeting in this case.

It should be understood that other embodiments include supporting video and other types of calls besides regular telephone calls. In such instances, telephony system 13072 may comprise a media router or media server still using substantially the same mechanism as described herein.

Telephony system 13072 can provide an inbound call alert to the human agent ("screen-pop"), providing user session ID 13040 and/or user session data 13043 retrieved in process 13075 and attached during process 13070. The agent desktop or screen pop component can use the same user session ID 13040 to retrieve additional detailed information 13090 about customer 13005 which were not passed in the attached user session data 13043. When the temporary agent access number is no longer in use, it may be recycled to the temporary agent access number pool 13020.

It should be understood that utilizing a pool 13020 of temporary agent access numbers is not the exclusive manner for managing temporary agent access number or telephone numbers. Other embodiments may generate or select a temporary agent access number or telephone number based on some number generation algorithm.

Figure 14:
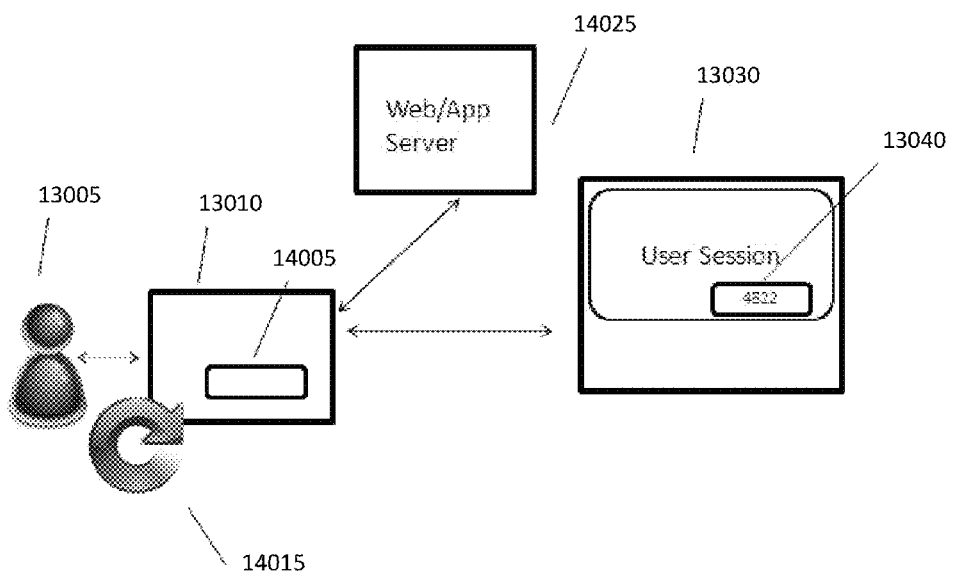
FIG. 14 depicts one embodiment of an arrangement for gathering user service session data, and associating the user session data with a session identification code or number.

FIG. 14 depicts one embodiment of an arrangement 14000 for gathering user session data, and associating the user session data with a session identification code or number (session ID).

Referring now to FIG. 14, there is shown how an optional embedded component 14005 which displays the temporary access number 14022 may also be used to track user interactions with website 13010, in the application or on a device. User 13005 is illustrated interacting with website 13010. Website 13010 is, in turn, typically interacting with a web or application server 13015 which hosts the web pages of website 13010. The user interaction may involve multiple steps, screens or processes 14015 with multiple roundtrips between website 13010 and web server 13015. Some or all of these steps, screens, events or processes can be tracked by embedded component 14005 of website 13010 and included in user session data 13043 which may be stored in one or more memory devices of user interaction server 13030.

Referring still to FIG. 14, tracking component 14005 feeds the tracked information back to the user interaction server 13030 (e.g., via user session data 13043) which maintains this tracked information for the user session on user interaction server 13030 and updates user session data 13043 which is optionally persisted to a permanent file store. Tracking component 14005 and temporary agent access number display component 13015 may be combined as a single component (e.g., widget, JAVA® applet, etc.) in some embodiments. Tracking component 14005 has an application programming interface, an example embodiment of which is detailed in FIG. 17. Some embodiments may omit tracking component 14005, and an API may be made available from user interaction server 13030 which may be invoked directly from website 13010 without the need for tracking component 14005.

Figure 15:
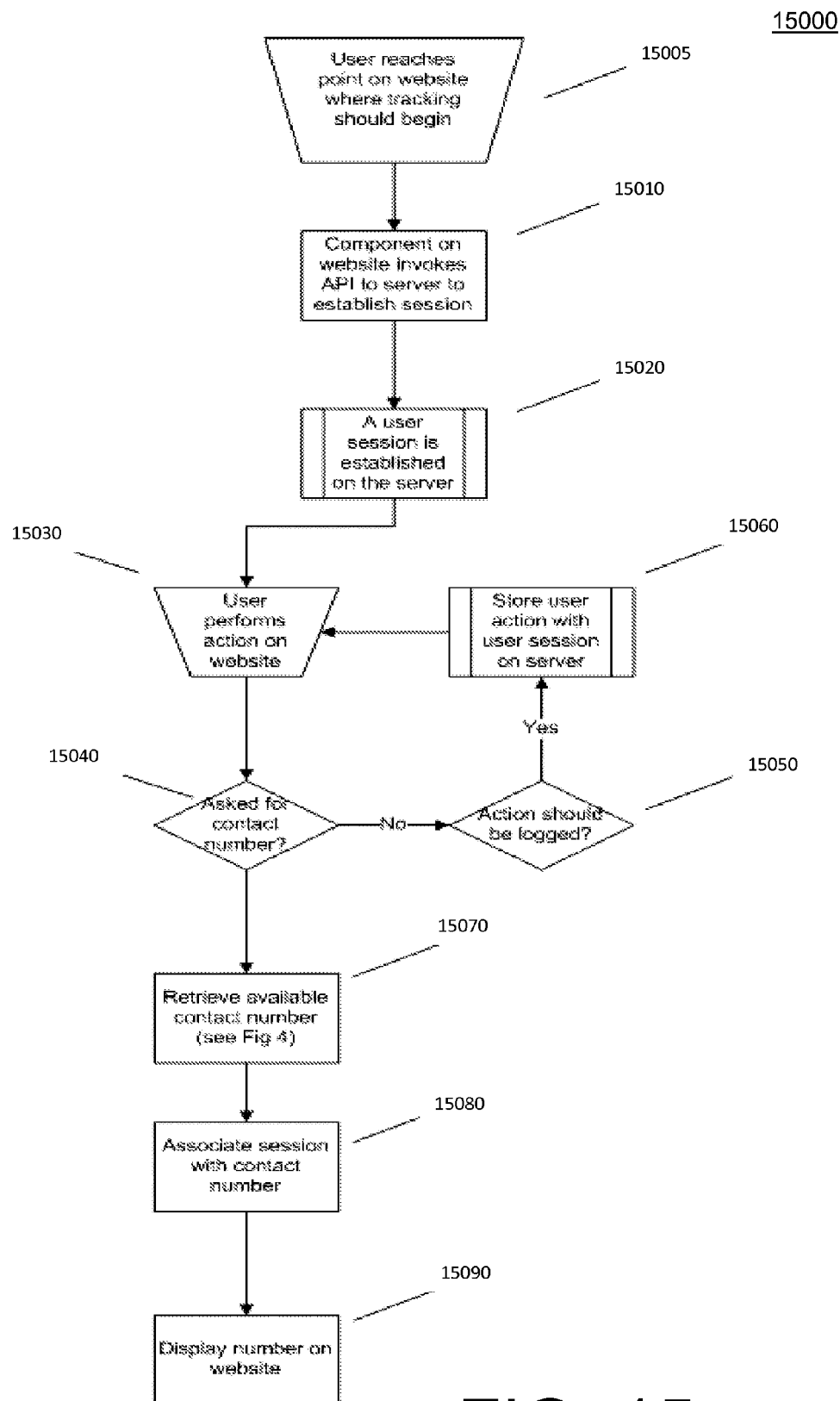
FIG. 15 depicts on embodiment of a method of gathering user session data, associating the user session data with a session identification code or number, and associating the session identification code or number with an agent access number.

FIG. 15 depicts on embodiment of a method 15000 of gathering user session data (e.g., user session data 13043) from a user interaction with a website (e.g., website 13010), associating the user session data with a session identification code or number (e.g., user session ID 13040), and associating the session identification code or number with one or more selected temporary agent access number(s) (e.g., selected temporary agent access number(s) 13022).

Referring now to FIG. 15, there is shown a process whereby a user interacting with a website may optionally send user session data, which may include tracking information, to a user interaction server (e.g., user interaction server 13030) and request a temporary agent access number (e.g., a temporary telephone number).

In more detail still referring to FIG. 15, there is shown that at some defined point 15005 within a web interaction session (user session) that certain information should be tracked. Examples include but are not limited to: a user places an item in their online shopping cart, or a user is viewing a high dollar item on an e-commerce website's store. In some embodiments, the website owner or developer may determine which events or actions are of importance to be tracked, and may utilize an API to initiate tracking. In operation 15010, the API or component is invoked to establish a user session on the user interaction server with a unique session key or user ID.

In operation 15020, the user session is established.

In still more detail still referring to FIG. 15, in operation 15030 a user may perform some action on the website. In operation 15040, it is determined whether the action is asking for an agent access number (e.g., a telephone number) to establish a communication channel (e.g., a voice call), or instead whether it is some other action (clicking a hyperlink, placing an item in the shopping basket, clicking a button etc). In operation 15050, a decision is made whether this user interaction should be tracked (logged), and if it is to be logged then data representing the action is stored on the user interaction server and associated with the unique user session ID as depicted at operation 15060.

In still more detail still referring to FIG. 15, if a user requests an agent access number (e.g., telephone number), then a process 15070 is utilized (see FIG. 16) to display a temporary agent access number (e.g., a temporary telephone number) to the user 13005, for example via a component of a web page of a website. That temporary phone number is reserved for a period of time uniquely assigned with the user and is associated with the user session ID on the user interaction server, as depicted in process 15080. The temporary agent access number is then displayed to the user via the website, and the customer may use that temporary agent access number to initiate a call to a human agent in operation 15090. It should be specifically noted that additional heuristics may determine whether a temporary access number is in fact shown to the user. External factors can be utilized such as first ensuring that a human agent is available to take the call (CTI Presence), or that the customer is performing a transaction of sufficiently high value as to warrant accepting and processing an inbound call.

Figure 16:
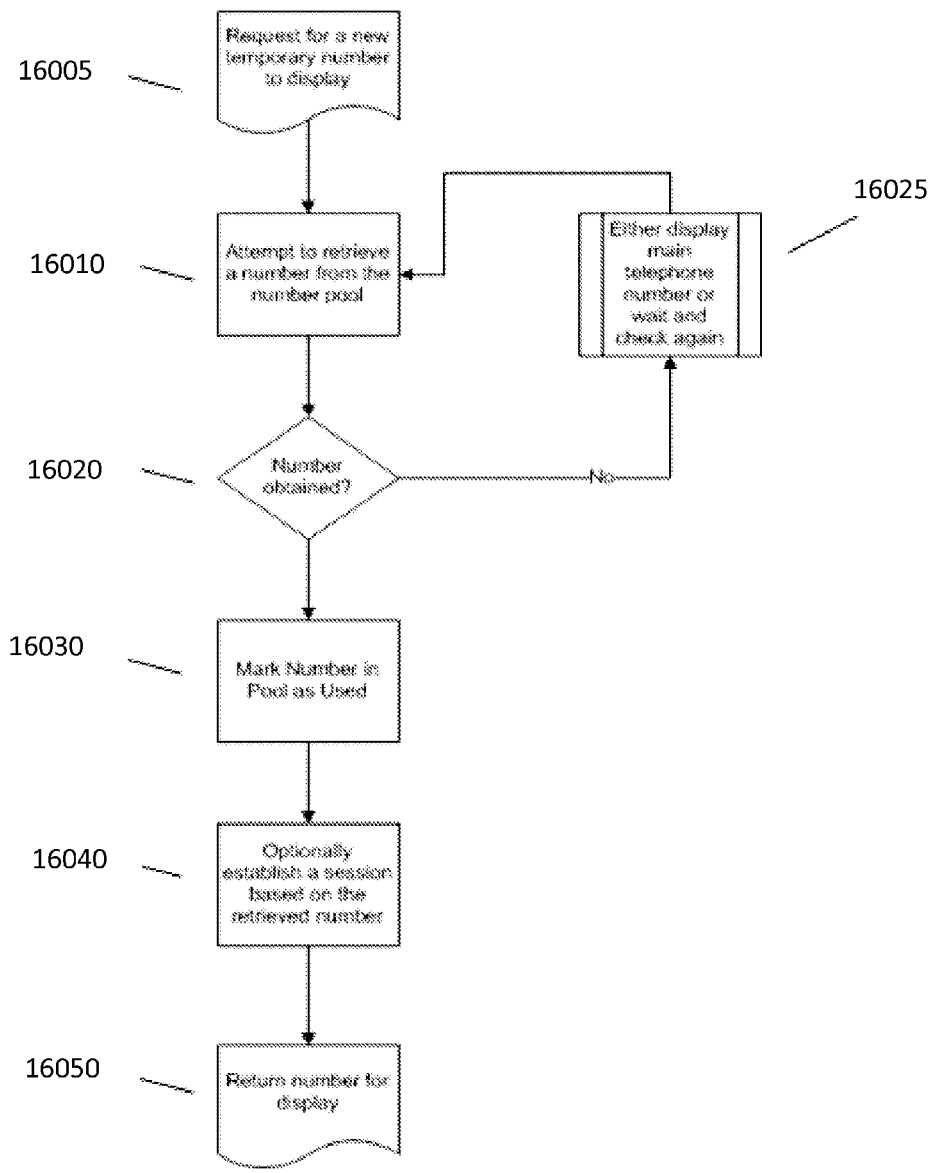
FIG. 16 depicts one embodiment of a process for obtaining one or more agent access numbers from a pool of temporary agent access numbers and assigning the obtained agent access number to an agent-initiated service session.

FIG. 16 depicts one embodiment of a process 16000 for selecting or obtaining one or more temporary agent access numbers from a pool of temporary agent access numbers, and assigning the obtained agent access number(s) to an agent-assisted service session.

Referring now to FIG. 16, there is shown a process whereby a temporary agent access number may be allocated from a pool of temporary agent access numbers. When a component on a website or mobile application or other device needs to present a telephone number to a user, the component may make a request to the user interaction server as depicted in process 16000. In operation 16010, the user interaction server may then attempt to obtain a free (non-used) agent access number from the pool of temporary agent access numbers, in addition to checking on optional external factors such as CTI presence and details of the user session. In operation 16020 a check is then made if a temporary agent access number was obtained or retrieved from pool of temporary agent access numbers. If no temporary agent access number has been obtained or retrieved, then in operation 16025 the system can either fallback to a default agent access number, or place the request into a retry queue and try some time later to obtain a temporary agent access number from the pool of temporary agent access numbers.

Referring still to FIG. 16, there is shown in operation 16030 that once one or more temporary agent access numbers are obtained from the pool, the obtained more temporary agent access number(s) is/are marked as used or allocated so that it would be reserved for the required duration and not reused by another caller while still in use.

Referring still to FIG. 16, there is shown an optional operation 16040 whereby a session is created on the user interaction server to establish a unique key (e.g., user session ID) associated with this temporary agent access number. In operation 16050, the temporary agent access number (e.g., telephone number) is then returned to the component for rendering or display.

Figure 17:
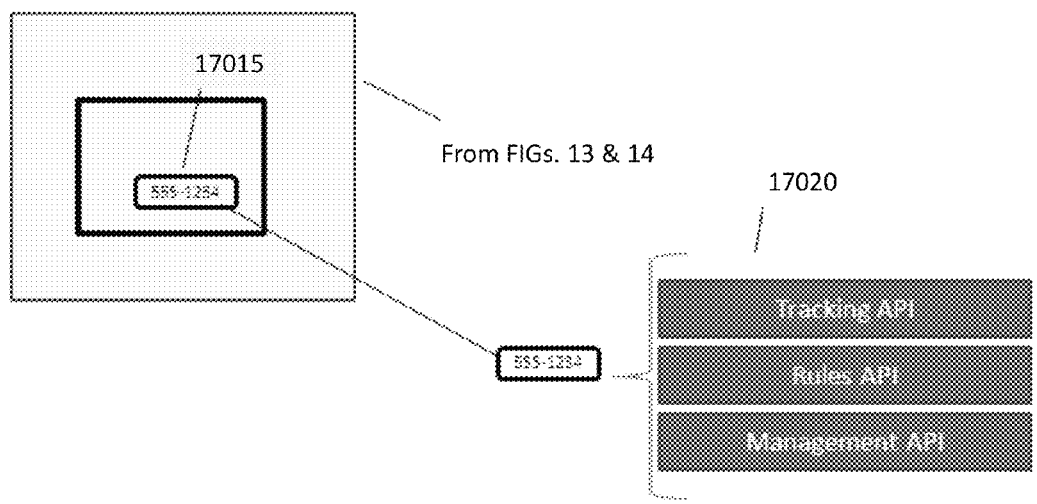
FIG. 17 depicts additional detail of one or more components illustrated in FIGS. 13 and 14.

FIG. 17 depicts additional detail of one or more components illustrated in FIGS. 13 & 14.

Referring now to FIG. 17, there is shown in more detail a component 17015. Component 17015 may comprise a widget, JAVA® applet, or other component of a web page of a website, which, for example, may include a piece of code embedded in the HTML code for the webpage. In various embodiments, component 17015 may comprise component 13015 of FIG. 13, which displays the assigned temporary agent access number 13022 and/or the tracking component 14005 of FIG. 14. Components 13015 and 14005 may be combined in a single component 17015. As depicted in FIG. 17, component 17015 has an Application Programming Interface (API) 17020 in order to interact with it and to control it. API 17020 offers functions that include, but are not limited to: Provide tracking information for relaying back to user interaction server 13030, a Rules API to provide rules (or an interface to a rules engine) that allows events to conditionally take place. An example includes, but is not limited to: Displaying the temporary agent access number (e.g., telephone number) only to users who are viewing items over a certain value. A Management API is also provided so that external websites can make requests for a temporary agent access number or indicate to the user interaction server via component 17015 that the temporary agent access number is no longer needed and can be returned to the pool.

Some embodiments of systems, methods, and arrangements disclosed herein may omit component 17015, and the API exposed by user interaction server 13030 may be invoked directly from a website or other external client.

Figure 18:
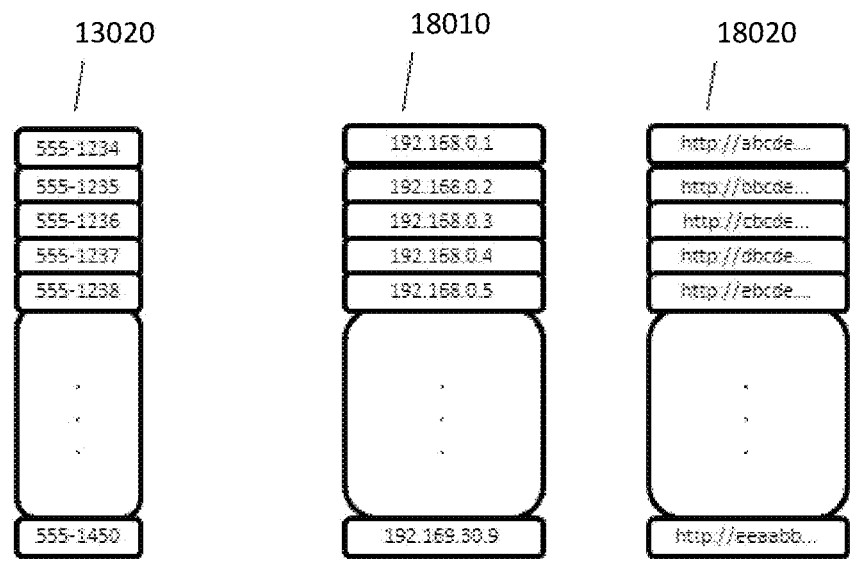
FIG. 18 depicts some embodiments of a pool of temporary agent access numbers.

FIG. 18 depicts some embodiments of a pool of temporary agent access numbers.

Referring now to FIG. 18, there is shown alternate embodiments of pool 13020 of temporary agent access numbers which indicate that the pool of temporary agent access numbers does not have to hold telephone numbers only. Alternate embodiments include using a pool 18010 of IP addresses for utilization in applications such as Voice over IP, contact addresses for SIP, or a pool 18020 of temporary unique HTTP links or URLs for use on websites, devices or apps. The contents of the pool of temporary agent access numbers will be determined by the connection mechanism used by user 13005 to contact the human agent, whether that be a voice call, a VoIP call, a SIP session a Video call or other communication channel.

Benefits and advantages of some of the arrangements described above may include, but are not limited to, providing a consistent customer service experience across multiple channels, a reduced cost of maintaining various scripts, and an improved customer service experience.

Broadly, the arrangements described above may provide for a single graphical customer service script creator with the ability to execute these scripts on multiple channels. In addition, a user using a script in one channel can at any time transition to another channel with continuity of the session.

Some features of some embodiments of the arrangements and methods described above with respect to FIGS. 13-18 may include but are not limited to:

A pool of available temporary contact numbers.

A user interaction server used to track user web interactions, provide unique user sessions, and maintain a pool of temporary agent access numbers (e.g., telephone numbers).

An optional user interface component that can display a temporary agent access number to a user on a number of channels, including but not limited to, a website, a mobile app or a set-top box.

An optional user interface component that can be used to track user interactions on the website, mobile app or a set-top box.

An API to the user interaction server that can be used to retrieve a temporary agent access number, return a temporary agent access number to a pool, and to provide and retrieve user tracking information The server is able to track whether agent access numbers in the pool are available to be used or mark them as used, and able to associate a unique user session key or ID with a specific agent access number from the pool.

A component that runs on existing IVR or telephony systems that can detect a temporary agent access number which has been dialed, and in response thereto to retrieve from a server the unique session ID associated with that temporary agent access number, to attach that user session ID and the tracking information to the call data, and to place that call in the call queue of the telephony system.

A component that runs on the IVR or telephony system that can use the interaction history of the user to determine how the call should be handled (for example, if the user was viewing expensive items on the website which was tracked by the tracking component, then the user's call may be placed into a high priority queue).

A component for the agent desktop that can retrieve the user session ID or key as part of the voice call and retrieve detailed user session data (e.g., web interaction history) from the user interaction server, and display the information to a human agent via a display screen which is accessed by the human agent.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

While preferred embodiments are disclosed herein, many variations are possible which remain within the concept and scope of the invention. For example, details of specific example embodiments have been described above wherein a user engages in a user session whereby the user interacts with a website prior to an agent-assisted service session. However, it should be understood that in other embodiments, a user may instead engage in a user session whereby the user interacts with other types of information systems, for example via a kiosk, or a television set, or a set-top box, prior to an agent-assisted service session. In that case, the user session data may comprises data gathered through those interactions, rather than through website navigation, and a selected temporary access number may be provided to the user via a user interface of that other type of information system. Such variations would become clear to one of ordinary skill in the art after inspection of the specification, drawings and claims herein. The invention therefore is not to be restricted except within the spirit and scope of the appended claims.

We claim:

1. A method, comprising:
    a self-service access terminal engaging a user in a user session, including displaying one or more user interface screens to the user via a display device of the self-service access terminal, wherein the user session produces user session data that is stored in one or more memory devices;
    determining at some point during the user session that an agent-assisted service session should be initiated between the user and a human agent;
    one or more processors generating one or more temporary agent access numbers through which a communication channel may be established between the user and a human agent for the agent-assisted service session;
    communicating one or more of the temporary agent access numbers to the user in response to the determination that an agent-assisted service session should be initiated;
    establishing a communication channel between the user and the human agent via a particular agent access number among the communicated one or more temporary agent access numbers, the communication channel being used for the agent-assisted service session;
    associating the user session data with the agent-assisted service session, wherein associating the user session data with the agent-assisted service session includes assigning a unique user session ID to the user session, and associating the user session data with the user session ID;
    associating the user session ID with the communicated one or more of the temporary agent access numbers; and
    communicating the user session data to the human agent in conjunction with the agent-assisted service session.

2. The method of claim 1, wherein determining that the agent-assisted service session should be initiated includes receiving a request from the user for the agent-assisted service session via the user session.

3. The method of claim 1, wherein the temporary agent access numbers are telephone numbers.

4. The method of claim 1, wherein the temporary agent access numbers are session initiation protocol numbers.

5. The method of claim 1, wherein generating the one or more temporary agent access numbers comprises retrieving the one or more temporary agent access numbers from a pool of temporary agent access numbers.

6. The method of claim 1, further comprising tracking interactions of the user and in response thereto producing tracking data, wherein the user session data includes the tracking data.

7. The method of claim 1, wherein the user session comprises user interactions with a website.

8. The method of claim 1, wherein the one or more processors generating one or more temporary agent access numbers comprise a user interaction server, and the wherein the user interaction server further communicates the one or more of the temporary agent access numbers to the user in response to the determination that the agent-assisted service session should be initiated.

9. The method of claim 1, wherein a telephony system establishes the communication channel between the user and the human agent via the particular agent access number.

10. A non-transitory data storage medium having stored thereon instructions for causing one or more processors to execute a process comprising:
    a user interaction server, which is connected via the Internet to a self-service access terminal, engaging a user in a user session, wherein the user session produces user session data that is stored in one or more memory devices
    determining at some point during the user session that an agent-assisted service session should be initiated between the user and a human agent;
    generating one or more temporary agent access numbers through which a communication channel may be established between a user and a human agent for the agent-initiated service session;
    communicating one or more of the temporary agent access numbers to the user in response to the determination that an agent-assisted service session should be initiated;
    establishing a communication channel between the user and the human agent via a particular agent access number among the communicated one or more temporary agent access numbers, the communication channel being used for the agent-assisted session;
    associating the user session data with the agent-assisted service session, wherein associating the user session data with the agent-assisted service session includes assigning a unique user session ID to the user session, and associating the user session data with the user session ID;
    associating the user session ID with the communicated one or more of the temporary agent access numbers; and
    communicating the user session data to the human agent in conjunction with the agent-assisted session.

11. The non-transitory data storage medium of claim 10, wherein determining that the agent-assisted service session should be initiated includes receiving a request from the user for the agent-assisted service session via the user session.

12. The non-transitory data storage medium of claim 10, wherein the agent access numbers are telephone numbers.

13. The non-transitory data storage medium of claim 10, wherein the agent access numbers are session initiation protocol numbers.

14. The non-transitory data storage medium of claim 10, wherein generating the one or more temporary access numbers comprises retrieving the one or more temporary access numbers from a pool of temporary agent access numbers.

15. The non-transitory data storage medium of claim 10, further comprising tracking interactions of the user and in response thereto producing tracking data, wherein the user session data includes the tracking data.

16. The non-transitory data storage medium of claim 10, wherein the user session comprises user interactions with a website.

* * * * *